United States Patent
Pancholi et al.

(10) Patent No.: US 12,184,482 B2
(45) Date of Patent: Dec. 31, 2024

(54) SYSTEM AND METHOD FOR MANAGING NETWORK DEVICE PROVISIONING

(71) Applicant: Rakuten Symphony, Inc., Tokyo (JP)

(72) Inventors: Sameer Pancholi, Indore (IN); Harish Sablani, Indore (IN); Shubhangi Gadhave, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/175,779

(22) Filed: Feb. 28, 2023

(65) Prior Publication Data
US 2024/0291711 A1    Aug. 29, 2024

(51) Int. Cl.
*H04L 41/0806* (2022.01)
*H04L 41/22* (2022.01)

(52) U.S. Cl.
CPC .......... *H04L 41/0806* (2013.01); *H04L 41/22* (2013.01)

(58) Field of Classification Search
None
See application file for complete search history.

(56) References Cited

U.S. PATENT DOCUMENTS

| | | | | |
|---|---|---|---|---|
| 11,614,975 B2* | 3/2023 | Butterworth | ............ | H04L 45/02 709/201 |
| 11,625,728 B2* | 4/2023 | Brazao | ............... | G06Q 20/4016 709/220 |
| 2002/0143927 A1* | 10/2002 | Maltz | ............... | H04L 45/62 709/224 |
| 2005/0015505 A1* | 1/2005 | Kruis | ............... | H04L 51/48 709/229 |
| 2005/0132030 A1* | 6/2005 | Hopen | ............... | H04L 41/12 709/223 |
| 2005/0149610 A1* | 7/2005 | Brooks | ............... | H04L 41/0806 709/200 |
| 2022/0141316 A1* | 5/2022 | Cooley | ............... | H04L 41/0806 709/223 |
| 2023/0198836 A1* | 6/2023 | Joyner | ............... | H04L 67/125 370/254 |
| 2023/0224214 A1* | 7/2023 | Bhargava | ............ | H04L 41/0806 709/220 |
| 2023/0283656 A1* | 9/2023 | Banerjee | ........... | H04L 45/74591 709/224 |
| 2023/0300035 A1* | 9/2023 | Synstelien | .......... | H04L 41/0806 709/223 |

OTHER PUBLICATIONS

"Windows 10 diagnostic data for the Full diagnostic data level". Posted at https://learn.microsoft.com/en-us/windows/privacy/windows-diagnostic-data-1703 on Feb. 16, 2023. (Year: 2023).*

* cited by examiner

*Primary Examiner* — Scott B Christensen
(74) *Attorney, Agent, or Firm* — Sughrue Mion, PLLC

(57) ABSTRACT

Provided are system, method, and device for managing network device provisioning. According to embodiments, the system includes: a memory storage storing computer-executable instructions; and at least one processor communicatively coupled to the memory storage, wherein the at least one processor may be configured to execute the instructions to: collect information from one or more information resources; process the collected information; and based on the processed information, perform an action associated with provisioning of one or more network devices.

19 Claims, 19 Drawing Sheets

| | | | | | |
|---|---|---|---|---|---|
| Site | | | | | |
| DETAIL | SITE DATA | PROJECT | DOCUMENT | TICKET | INVENTORY | AUTO COMMISSIONING |

711 — (top bar)
721 — AUTO COMMISSIONING
731 — (edit icon)

Site Information

Site Name
Building A

Construction ID
--

SARF ID
ID A

Contract ID
--

Phase
Phase 5

Site Type
IBS

Latitude
AA.BBBBB

Longitude
CCC.DDDDD

Region
REGION A

Prefecture
PREFECTURE A

City
CITY A

Town
TOWN A

Postal Code
--

Frequency Band
X GHz

Vendor
Vendor X

Design/Operation
--

FIG. 7

| Site 1 | | | | | | |
|---|---|---|---|---|---|---|
| DETAIL | SITE DATA | PROJECT | DOCUMENT | TICKET | INVENTORY | AUTO COMMISSIONING |
| Building A >> Floors | | | | | | |
| Floor Name | | Floor Map | Small Cell | Edge Switch | CLAIM DATA | Floor Switch |
| A | | Yes | 0 | 0 | | 0 | ... |
| B | | Not Available | 40 | 1 | | 8 | ... |
| C | | Yes | 100 | 2 | | 10 | ... |

FIG. 8

| Site 1 | | | | | | |
|---|---|---|---|---|---|---|
| DETAIL | SITE DATA | PROJECT | DOCUMENT | TICKET | INVENTORY | AUTO COMMISSIONING |

| Status | Name | Work Order | Planned/Baseline Date Start/End | Actual/Projected Start/End | Stage |
|---|---|---|---|---|---|
| On Track 50 % | Project 1 | Order 1 | 202X- YY- YY 202X- YY- YZ | 202X- YY- YY 202X- YY- YZ | Stage X |
| Delayed 0 % | Project 2 | Order 2 | 202X- YY- YY 202X- YY- YZ | 202X- YY- YA 202X- YY- YB | Stage Y |
| On Track 36 % | Project 3 | Order 3 | 202X- YC- YD 202X- YE- YF | 202X- YC- YD 202X- YE- YF | Stage X |

On Track  Completed  Yet To Start  Delayed  On Hold

Page No. X  1 to 3 of 3

FIG. 10

| DETAIL | SITE DATA | PROJECT | DOCUMENT | TICKET | INVENTORY | AUTO COMMISSIONING |
|---|---|---|---|---|---|---|
| Name | | | Folder/Files | | History | Actions |
| ☐ Site Information | | | 4/1 | | Modified by User 1<br>202X-AA-BB | ... |
| ☐ Document of Project 1 | | | 10/1 | | Uploaded by User 2<br>202X-AB-BA | ... |
| ☐ Site Agreement | | | 1/1 | | Modified by User 3<br>202X-AB-BA | ... |
| ☐ Document of Project 2 | | | 2/0 | | File deleted by User 2<br>202X-AB-BA | ... |
| ☐ Shipment Details of Material X | | | 3/2 | | Uploaded by User 2<br>202X-AB-BA | ... |
| ☐ Document of Project 3 | | | 10/1 | | Uploaded by User 1 | ... |

Page No. 1 ▼    Rows Per Page: 25 ▼    1 to 25 of 40

FIG. 11

| Site 1 | | | | | | |
|---|---|---|---|---|---|---|
| DETAIL | Site DATA | PROJECT | DOCUMENT | TICKET | INVENTORY | AUTO COMMISSIONING |

| | Ticket ID<br>Ticket Name | Severity | Ticket Status | Category | Users | Due Date |
|---|---|---|---|---|---|---|
| ☐ | Issue A | Level A | Open | Material Quality | - Raised by : User 1<br>- Assigned to : User 2 | 202X-YY-YY |

New | Open | Closed | Resolved | Cancelled

Page No. [ ]  1 to 3 of 3

| Site 1 | | | | | |
|---|---|---|---|---|---|
| DETAIL | SITE DATA | PROJECT | DOCUMENT | TICKET | INVENTORY | AUTO COMMISSIONING |
| IP TRANSPORT | | | | | | |
| | | Trigger Time: 202X-X-XX | Status: Success | | RETRIGGER | DOWNLOAD | UPLOAD |
| ATP | | | | | | |
| | | Trigger Time: 202X-X-XX | Status: Failed | | RETRIGGER | DOWNLOAD | UPLOAD |

FIG. 15

```
deviceType:                      "Device A"
address:                         "Address A"
latitude:                        "AA.BBBBB"
mringIdentifier:                 "2"
edgeSwitch1DeviceName:           "SW1"
gcSiteIdentifier:                "7"
terminatingMBnodeType:           "AG1"
terminatingMBnode:
  - 0:
      terminatingMBnodeName:     "UHN1"
      terminatingMBnodeLoIP:     "aaaa:bbbb:cccc::dddd:e:f"
      terminatingMBnodeMgmtIP:   "aaaa:bbbx:cccc::dddd:e:f"
      terminatingMBnodePort:     "FiveGigE0/0/00"
gcringIdentifier:                "2"
dualHoming:                      "no"
superblockIdentifier:            "1"
sarId:                           "ID A"
noOfBuildingSwitchesKCS:         "1"
buildingSwitchMCSplanned:        "yes"
gcName:                          "gc A"
longitude:                       "CCC.DDDDDD"
gcCode:                          "gc_A"
```

FIG. 16

```
▼ 0:
    deviceInstallationId:    ""
    serialNumber:            "Serial X"
    inputPowerIbs:           ""
    bandwidth:               "Y Hz"
    deviceIdIbs:             "SW1"
    pciIbs:                  ""
    macIds:                  ""
    macWifi:                 ""
    deviceType:              "Device A"
    deviceNameIbs:           "BuildingX_DA_X"
    macEth:                  ""
    cellIdIbs:               ""
    macAddress:              ""
    deviceInformation:
       id:                   "ID_A"
       rsiIbs:               ""
       rrhscIdIbs:           ""
       siteType:             "IDSC"
▼ 1:
    deviceInstallationId:    ""
    serialNumber:            "Serial Y"
    inputPowerIbs:           ""
    bandwidth:               "Z Hz"
    deviceIdIbs:             "SW2"
...
```

FIG. 17

SYSTEM AND METHOD FOR MANAGING NETWORK DEVICE PROVISIONING

TECHNICAL FIELD

Systems, methods, and devices consistent with example embodiments of the present disclosure relate to managing network device, and more specifically, relate to managing provisioning of one or more network devices in a network.

BACKGROUND

Network provisioning is the process of preparing, equipping, and operating a network in a site (e.g., an indoor building, an outdoor infrastructure, etc.), in order to provide one or more network services therefrom. Among others, provisioning of network devices is one of the most critical operations in network provisioning, in view of the significant amount of resources (e.g., manpower, materials, time, cost, etc.) involved.

By way of an example, in order to provide a network in a building, network devices such as a plurality of switches (e.g., a plurality of edge switches, a plurality of floor switches, etc.), a plurality of small cells (e.g., distributed units, etc.), and the like, are required to be properly designed, installed, tested, and operated at the building.

The provisioning of network devices includes complex processes and stages, each of which may involve multiple users and parties. For example, the provisioning of network devices may include: site acquisition, network design, materials (e.g., network devices, cables, etc.) procurement and shipment, materials installation and testing, network devices commissioning, and the like, each of which may involve multiple users.

In the related art, it is unduly challenging for the users to effectively and efficiently collaborate with each other, particularly when the number of network devices and/or the number of involved users is huge.

To begin with, in the related art, the users involved in different stages of network device provisioning are required to manually and independently manage the associated information, which may be inefficient, burdensome, and easy to introduce error. For instance, a first user(s) involved in site acquisition activity may manually collect, arrange, and store information associated with site acquisition, such as: agreement between the network planer and the site owner, approval from the site owner, site materials obtained from site owner, or the like. In this regard, whenever said information is required by a second user(s) (e.g., one or more users involved in network design activity, etc.), said second user(s) may need to manually request (e.g., obtain contact information of the first user(s), initiate contact with the first user(s), specify the required information, etc.) the required information from the first user(s). Subsequently, the first user(s) may need to manually search for and obtain the requested information, and then provide said information to the second user(s). Such approaches in the related art are time consuming, and the turn-around time among the communication of the users may be long, which may in turn result in delay of the overall provisioning of network device.

Further, a user(s) may utilize multiple systems or equipment throughout the associated network device provisioning process, which may further complicate and reduce the efficiency of the information management. For example, a third user(s) involved in testing of an installed network device may utilize a first system/equipment to test the installed network device, may utilize a second system/equipment to obtain a copy of the test result (e.g., taking a photo of the test results along with the installed network device, etc.), may utilize a third system/equipment to store the testing result, or the like. Such approaches may be time consuming, inefficient, and burdensome for the user(s). Particularly, whenever the user(s) needs to manually transfer the information from one system/equipment to another system/equipment, the information may be originally incompatible to the other system and the user(s) may need to spend extra efforts to process or convert the information, which may further delay the provisioning of the network device and increase the difficulty in information management.

Furthermore, since different users may manage the information in different ways, the information being shared among the users may be in different formats, may have different levels of detail, may have different presentation styles, or the like, which may result in difficulties for the users to effectively review, analyze, verify, or the like, the information.

Further still, since the information are being managed and utilized by a large number of users, there is a risk of information leakage and information losses. For instance, sensitive information may be unintentionally shared, accessed, or the like, by non-associated or unauthorized user. As another example, a physical copy of information (e.g., site drawings, paper documents, etc.) may be misplaced, damaged, or lost, if not been carefully stored and maintained.

In addition, in the related art, upon installation of the network devices, the associated user (e.g., system admin, network planner, etc.) may need to manually perform commissioning for each of the network devices. For instance, the associated user may need to manually obtain the associated information (e.g., site report, test results, photos showing the installed network devices, etc.), to verify the installation of the network devices (e.g., perform site inspection, compare the photos of the installed network devices with the design plan, etc.), and to visit the site to manually activate (e.g., power on, etc.) the installed network devices. Such approaches may be inefficient and ineffective, and may be overwhelming and burdensome to the associated user, particularly when a significant amount of network devices are involved.

SUMMARY

Example embodiments of the present disclosure provides a system, a method, and a device to simplify the information management throughout various stages of the provisioning of one or more network devices, to enable effective information sharing among users, to standardize and to unify the information presentation, to enhance information security and to reduce the risk of information losses, as well as to simplify the operation of and to improve the efficiency of commissioning the one or more network devices.

According to embodiments, a system is provided. The system may include: a memory storage storing computer-executable instructions; and at least one processor communicatively coupled to the memory storage. The at least one processor may be configured to execute the instructions to: collect information from one or more information resources; process the collected information; and based on the processed information, perform an action associated with provisioning of one or more network devices.

According to embodiments, the one or more information resources may include at least one of: a network planning system, a ticket management system, a user management system, and a user equipment. The at least one processor may be configured to execute the instructions to process the collected information by: filtering the collected information according to one or more information categories; and aggregating the filtered information according to the one or more information categories.

According to embodiments, the one or more information categories may include at least one of: network device type, site information, project information, document information, ticket information, and auto-commissioning information.

According to embodiments, the at least one processor may be configured to execute the instructions to perform the action by storing the aggregated information according to the one or more information categories.

According to embodiments, the one or more information categories may include auto-commissioning information, and the at least one processor may be configured to execute the instructions to perform the action by: generating, based on the auto-commissioning information, one or more triggers for commissioning the one or more network devices; and commissioning the one or more network devices based on the one or more triggers.

According to embodiments, the at least one processor may be configured to execute the instructions to perform the commissioning by: outputting the one or more triggers to a device management system communicatively coupled to the one or more network devices. The device management system may include at least one of: an operations support system (OSS), an element management system (EMS), and a network management system (NMS). The device management system may be configured to perform the commissioning on the one or more network devices based on the one or more triggers.

According to embodiment, the at least one processor may be configured to execute the instructions to output the one or more triggers by: generating at least one graphical user interface (GUI) including the auto-commissioning information and at least one interactive element; presenting the at least one GUI to a user; and based on determining a user interaction with the at least one interactive element, outputting the one or more triggers to the device management system.

According to embodiments, the one or more triggers may include at least one of: an Internet Protocol (IP) transport trigger and an Acceptance Test Procedure (ATP) trigger.

According to embodiments, the at least one processor may be configured to execute the instructions to perform the action by: generating, based on the aggregated information, one or more GUIs, each of which may include information associated with a respective information category among the one or more information categories; and presenting the one or more GUIs to a user.

According to embodiments, a method performed by at least one processor is provided. The method may include: collecting information from one or more information resources; processing the collected information; and based on the processed information, performing an action associated with provisioning of one or more network devices.

According to embodiments, the one or more information resources may include at least one of: a network planning system, a ticket management system, a user management system, and a user equipment. The processing the collected information may include: filtering the collected information according to one or more information categories; and aggregating the filtered information according to the one or more information categories.

According to embodiments, the one or more information categories may include at least one of: network device type, site information, project information, document information, ticket information, and auto-commissioning information.

According to embodiments, the performing the action may include storing the aggregated information according to the one or more information categories.

According to embodiments, the one or more information categories may include auto-commissioning information, and the performing the action may include: generating, based on the auto-commissioning information, one or more triggers for commissioning the one or more network devices; and commissioning the one or more network devices based on the one or more triggers.

According to embodiments, the commissioning the one or more network devices may include: outputting the one or more triggers to a device management system communicatively coupled to the one or more network devices. The device management system may include at least one of: an operations support system (OSS), an element management system (EMS), and a network management system (NMS). The device management system may be configured to perform the commissioning on the one or more network devices based on the one or more triggers.

According to embodiments, the outputting the one or more triggers may include: generating at least one graphical user interface (GUI) including the auto-commissioning information and at least one interactive element; presenting the at least one GUI to a user; and based on determining a user interaction with the at least one interactive element, outputting the one or more triggers to the device management system.

According to embodiments, the one or more triggers may include at least one of: an Internet Protocol (IP) transport trigger and an Acceptance Test Procedure (ATP) trigger.

According to embodiments, the performing the action may include: generating, based on the aggregated information, one or more GUIs, each of which may include information associated with a respective information category among the one or more information categories; and presenting the one or more GUIs to a user.

According to embodiments, a non-transitory computer-readable recording medium is provided. The non-transitory computer-readable recording medium may have recorded thereon instructions executable by at least one processor to cause the at least one processor to perform a method including: collecting information from one or more information resources; processing the collected information; and based on the processed information, performing an action associated with provisioning of one or more network devices.

According to embodiments, the non-transitory computer-readable recording medium may have recorded thereon instructions executable by at least one processor to cause the at least one processor to perform the method, wherein the one or more information resources may include at least one of: a network planning system, a ticket management system, a user management system, and a user equipment. The processing the collected information may include: filtering the collected information according to one or more information categories; and aggregating the filtered information according to the one or more information categories.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein:

FIG. 7 illustrates an example GUI for presenting site information, according to one or more embodiments;

FIG. 8 illustrates an example GUI for presenting site data, according to one or more embodiments;

FIG. 10 illustrates an example GUI for presenting information of one or more projects, according to one or more embodiments;

FIG. 11 illustrates an example GUI for presenting information of one or more documents, according to one or more embodiments;

FIG. 12 illustrates an example GUI for presenting information of one or more tickets, according to one or more embodiments;

FIG. 15 illustrates an example GUI for presenting information of an auto-commissioning operation, according to one or more embodiments;

FIG. 16 illustrates an example of an internet protocol (IP) transport trigger, according to one or more embodiments;

FIG. 17 illustrates an example of an acceptance test procedure (ATP) trigger, according to one or more embodiments.

DETAILED DESCRIPTION

Figure 1:
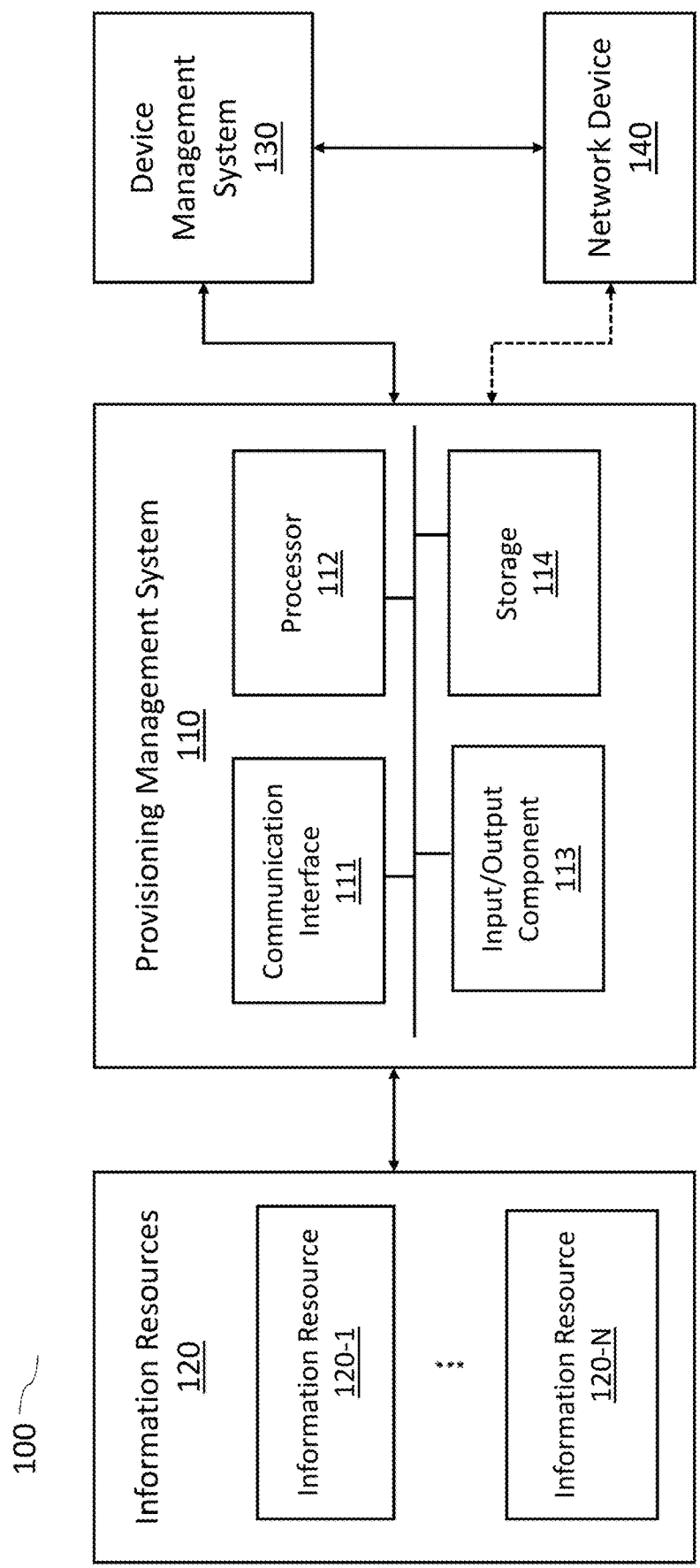
FIG. 1 illustrates a block diagram of an example system configuration for managing provisioning of one or more network devices, according to one or more embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without being limited to specific software code. It is understood that software and hardware may be designed to implement the systems and/or methods based on the description herein.

Even though particular combinations of features are disclosed in the specification, these combinations are not intended to limit the disclosure of possible implementations. In fact, many of these features may be combined in ways not specifically disclosed in the specification.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Systems, methods, devices, and the like, provided in the example embodiments of the present disclosure, simplify the information management throughout various stages of the provisioning of one or more network devices (may be referred to as "network device provisioning" herein), enable effective information sharing among users, standardize and unify the information presentation, enhance information security and reduce the risk of information losses, as well as simplify the operation of and improve the efficiency of commissioning the one or more network devices.

Specifically, example embodiments of the present disclosure provide a provisioning management system which may collect information from various types of information resources throughout various stages of the network device provisioning, process the collected information, and perform appropriate action(s) associated with the network device provisioning.

According to example embodiments, the provisioning management system may automatically filter the collected information and aggregate the collected information according to one or more information categories, and may perform at least one of the following actions: storing the aggregated information in one or more storage mediums according to the one or more information categories, presenting one or more graphical user interfaces (GUIs) including appropriate information and interactive elements to the associated user (s), and performing commissioning of the one or more network devices. The provisioning management system may continuously (or periodically) perform one or more of the above described operations throughout various stages of the network device provisioning, in real-time or near real-time.

Accordingly, multiple users involved in various stages of the network device provisioning (may be referred to as "the users" herein) may easily, quickly, and effectively obtain the updated information from the provisioning management system when required, without being required to individually or manually contact the respective user for requesting the information as in the related art. For instance, the users may simply access the provisioning management system (e.g., via a user equipment, via another system, via a component of the provisioning management system, etc.) when required, and the provisioning management system may obtain the most recently aggregated information and present the same to the users (via one or more GUIs, etc.).

Further, since the information associated with various stages of the network device provisioning may be managed by the provisioning management system, the users do not need to manually manage the information, which in turn reduces the risk of information losses. Furthermore, since the provisioning management system is accessible by associated or authorized users only, and since the provisioning management system may present only information associated with the respective users (e.g., specific information may be presented only to users that require said information, etc.), the risk of information leakage may be reduced.

Additionally, the number of systems and equipment being utilized by the users during the network device provisioning may be reduced. For instance, the users may directly utilize the system in performing one or more associated tasks, such as reviewing a network design via the one or more GUIs presented by the provisioning management system and approving/rejecting the network design via interacting with one or more interactive elements included in the one or more GUIs. As another example, the provisioning management system may communicate with one or more software applications or computer programs deployed on a terminal or an equipment of the users, and the users may simply utilize the software application/computer program for performing the associated activity. By way of example, the provisioning management system may communicate (e.g., via application programming interface (API) calls, etc.) with a camera application deployed on the user equipment, and the users may simply take a photo of an installed network device, scan a code (e.g., bar code, quick response (QR) code, etc.) associated with the network device, or the like, via the camera application. Accordingly, the provisioning management system may automatically obtain the associated information therefrom, without requiring the users to manually or separately provide said information.

Furthermore, the provisioning management system may present the information to the users in a standardized manner. For instance, regardless of the differences in the information obtained from the information resources, the provisioning management system may process and present the information with a consistent presentation format and level of details (intended or specified by the users, etc.). In this way, the presented information may be easily reviewed or utilized by the users.

Moreover, the provisioning management system may automatically provide a notification to inform the associated user(s) whenever the required information is obtained and the operations associated thereto are ready to be performed. For instance, upon completion of a network design stage, the provisioning management system may automatically determine, from the finalized network design, materials or network devices required and may provide the notification message including information of said materials/devices to a user in-charge of procurement activity.

Likewise, upon determining completion of a specific stage(s) of the network device provisioning, the provisioning management system may automatically initiate the commissioning of the associated network device(s). For instance, upon determining a completion of installation of a network device, the provisioning management system may collect information required for commissioning the network device, may generate one or more triggers for performing the commissioning based thereon, and may perform commissioning of the one or more network devices based on the one or more triggers.

In this regard, the provisioning management system may output the one or more triggers automatically (e.g., in response to an event, etc.) and/or in response to a user input. In the former scenario, the provisioning management system may, upon determining that a threshold or a condition is satisfied (e.g., a ratio of network devices has been installed, etc.), automatically output the one or more triggers to perform commissioning on the associated network devices. In the later scenario, the provisioning management system may, upon generating the one or more triggers, present the associated information to the associated users (e.g., via one or more GUIs), and the associated users may quickly review and send the trigger(s) by simply interacting (e.g., one-click, etc.) with the interactive element(s) included in the one or more GUIs. In either way, the commissioning of multiple network devices may be effectively performed (e.g., commissioning of all network devices may be performed based on one trigger, etc.).

It is contemplated that features, advantages, and significances of example embodiments described hereinabove are merely a portion of the present disclosure, and are not intended to be exhaustive or to limit the scope of the present disclosure.

Further descriptions of the features, components, configuration, operations, and implementations of the provisioning management system of the present disclosure, according to one or more embodiments, are provided in the following.

Example System Architecture

FIG. 1 illustrates a block diagram of an example system configuration 100 for managing provisioning of one or more network devices, according to one or more embodiments. Referring to FIG. 1, system 100 may include a provisioning management system 110, a plurality of information resources 120, at least one device management system 130, and at least one network device 140.

In general, the provisioning management system 110 may be configured to collect information from the plurality of information resources 120 throughout various stages of the network device provisioning, such as provisioning of the network device 140. Accordingly, the provisioning management system 110 may process the collected information and may perform one or more actions for managing the network device provisioning.

Among others, the provisioning management system 110 may generate, based on the collected information, one or more triggers for commissioning the one or more network devices. Subsequently, the provisioning management system 110 may provide the one or more triggers to the device management system 130, and the device management system 130 may be configured to perform commissioning of the one or more network devices based on the one or more triggers. Alternatively or additionally, the provisioning management system 110 may directly provide the one or more triggers to the one or more network devices, and the one or more network devices may perform the commissioning based thereon. The configurations, operations, or the like, associated with the system 100 (and the components included therein) are further described in the following.

Referring to FIG. 1, according to embodiments, the provisioning management system 110 may include at least one communication interface 111, at least one processor 112, at least one input/output component 113, and at least one storage 114.

The communication interface 111 may include at least one transceiver-like component (e.g., a transceiver, a separate receiver and transmitter, a bus, etc.) that enables the components of provisioning management system 110 to communicate with each other and to communicate with one or more components external to the provisioning management system 110, such as via a wired connection, a wireless connection, or a combination of wired and wireless connections.

For instance, the communication interface 111 may couple the processor 112 to the storage 114 to thereby enable them to communicate and to interoperate with each other in performing one or more operations. As another example, communication interface 111 may couple the provisioning management system 110 (or one or more components included therein) to one or more information resources, to the device management system 130, and/or to the network device 140, so as to enable them to communicate and to interoperate with each other. According to embodiments, the communication interface 111 may include one or more APIs which allows the provisioning management system 110 (or one or more components included therein) to communicate to one or more computer software or one or more application programs (e.g., application programs deployed in the information resources 120, etc.).

The input/output component 113 may include at least one component that permits the provisioning management system 110 to receive information and/or to provide output information from the provisioning management system 110. It can be understood that, in some embodiments, the input/output component 113 may include at least one input component (e.g., a touch screen display, a button, a switch, a microphone, a sensor, etc.) and at least one output component (e.g., a display, a speaker, one or more light-emitting diodes (LEDs), etc.), each of which may be separated from each other.

The processor 112 may include at least one processor capable of being programmed to perform a function(s) or an operation(s) described herein. For instance, the processor 112 may be configured to execute computer-readable instructions stored in at least one storage medium (e.g., storage 114, etc.) to thereby perform one or more actions or one or more operations described herein.

According to embodiments, the processor 112 may be configured to receive (e.g., via the communication interface 111, via the input/output component 113, etc.) one or more signals and/or one or more user inputs defining one or more instructions for performing one or more actions or operations. Further, the processor 112 may be implemented in hardware, firmware, or a combination of hardware and software. For instance, processor 112 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing or computing component.

According to embodiments, the processor 112 may be configured to collect, extract, and/or receive one or more information from the plurality of information resources 120 and to perform one or more actions or one or more operations associated with network device provisioning based on said information. Descriptions of several example operations which may be performed by the processor 112 are provided below with reference to FIG. 2 to FIG. 4.

The storage 114 may include one or more storage mediums suitable for storing data, information, and/or computer readable instructions therein. According to embodiments, the storage 114 may include a random access memory (RAM), a read only memory (ROM), and/or another type of dynamic or static storage device (e.g., a flash memory, a magnetic memory, and/or an optical memory) that stores information and/or instructions for use by the processor 112. Additionally or alternatively, the storage 114 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

According to embodiments, the storage 114 may be configured to store information obtained from one or more of the plurality of information resources 120, such as raw data, metadata, or the like. Additionally or alternatively, the storage 114 may be configured to store one or more information processed by the processor 112. For instance, the storage 114 may store one or more information filtered by the processor 112, one or more information enriched by the processor 112, one or more information aggregated or modified by the processor 112, or the like. In some implementation, the storage 114 may include a plurality of storage mediums located at different locations, and the storage 114 may be configured to store a duplicate or a copy of at least a portion of the information in the plurality of storage mediums, for providing redundancy and for backing-up the information or the associated data.

According to embodiments, the storage 114 may store the one or more information according to one or more information categories. In some implementations, the storage 114 may include a plurality of partitions, each of which may be associated with a respective information category and may be configured to store information associated with the respective information category. By way of example, storage 114 may include a first partition for storing site information, a second partition for storing ticket information, a third partition for storing network device information, a fourth partition for storing auto-commissioning information, or the like, although it can be understood that the storage 114 may also store the information according to the one or more information categories in any other suitable manner, without departing from the scope of the present disclosure. Furthermore, the storage 114 may also store computer-readable instructions which, when being executed by one or more processors (e.g., processor 112), causes the one or more processors to perform one or more actions/operations described herein.

Referring still to FIG. 1, the information resources 120 may include a plurality of information resources 120-1 to 120-N. According to embodiments, the information resources 120 may include an equipment or a terminal with which a user utilized in one or more stages/processes of network device provisioning, said equipment or terminal may include (but are not limited to): mobile devices and phones such as cellular phones (e.g., any "smart phone"), a personal computer, server computer, or laptop computer; personal digital assistants (PDAs); a roaming device, such as a network-connected roaming device; a wireless device such as a wireless email device or other device capable of communicating wireless with a computer network; or any other type of network device that may communicate over a network and handle electronic transactions. In this regard, any discussion of any mobile device mentioned may also apply to other devices, such as devices including short-range ultra-high frequency (UHF) device, near-field communication (NFC), infrared (IR), and Wi-Fi functionality, among others.

Additionally or alternatively, the information resources 120 may include one or more systems associated with one or more stages/processes of network device provisioning, such as a network planning system which may be utilized by one or more users to plan and design the network, a ticket management system which may be configured to manage one or more tickets associated with issues and/or requests the user(s) have raised throughout the network device provisioning, or the like.

Further, it can be understood that the device management system 130 and/or the network device 140, to which the provisioning management system 110 communicatively coupled, may also act as an information resource. For instance, the device management system 130 may provide commissioning status of one or more network devices to the provisioning management system 110, the network device 140 may provide the associated health status to the provisioning management system 110, or the like. Similarly, the information resources 120 may also include one or more users who directly provide the information to the provisioning management system 110 via the input/output component 113, or one or more user equipment associated with the one or more users.

On the other hand, device management system 130 may include at least one operations support system (OSS), at least one element management system (EMS), at least one network management system (NMS), and/or any other suitable system which may be configured to manage the one or more network devices. According to embodiments, the device management system 130 may be configured to perform the commissioning of the one or more network devices (e.g., network device 140), based on one or more information or data (e.g., one or more triggers, etc.) provided by the provisioning management system 110. In addition, the device management system 130 may be configured to perform one or more of management operations on the one or more network devices, such as: fault management, configuration management, account management, performance management, and security management (may be collectively referred to as "FCAPS management" herein).

In some embodiments, the device management system 130 may include an OSS and a plurality of EMSs, each of the plurality of EMSs may be configured to manage a single network device or a group of network devices (e.g., network device(s) associated with a particular manufacturer or vendor, network device(s) associated with a particular device type, network device(s) associated with a particular location of the site, etc.), and the OSS may interface between the provisioning management system 110 and the plurality of EMSs.

According to embodiments, the device management system 130 may perform commissioning of multiple network devices in parallel. For instance, the device management system 130 may activate all network devices installed in a floor of a building, may power on all network devices associated with a specific device type at once, or the like, based on one or more triggers received from the provisioning management system 110.

The network device 140 may include one or more devices constituting a network. For example, the network device 140 may include at least one radio unit (RU), at least one distributed unit (DU), and/or any suitable type of devices which may constitutes a network cell (e.g., small cell, femtocell, macrocell, etc.), one or more floor switches deployed on each floor of the site (e.g., building, etc.) and communicatively couple the network cell to an edge switch, and one or more edge switches communicatively couple the floor switches and the network cell to one or more components external from the site (e.g., a server in a data center, etc.). It can be understood that the network device 140 may include any other type of device (e.g., at least one centralized unit (CU), etc.), in addition to those described hereinabove.

Further, it is contemplated that the configuration illustrated in FIG. 1 is merely an example, and the system configuration may be different from the one described above. Specifically, the provisioning management system 110 may include more or less components, the arrangement of the components may be different, the configuration among the provisioning management system 110 and other system(s) or component(s) may be arranged in a different, or the like, without departing from the scope of the present disclosure.

For instance, the provisioning management system may be communicatively coupled to at least one user management system which is configured to perform one or more actions associated with the users. By way of example, based on determining that an unauthorized user (e.g., unregistered user, non-login user, etc.) has attempted to access the provisioning management system, the provisioning management system may direct the user to the user management system, and the user management system may be configured to perform one or more operation for authenticating and/or authorizing the user (e.g., registering the user, enable the user to login, grant temporary access, etc.). Upon successful user authentication and authorization, the user management system may redirect the user back to the provisioning management system, along with a security token and the user information (e.g., user role, access privilege, associated project, information of interest, preferred presentation format, etc.). In this regard, the user management system may act as an information resource.

In a similar manner, the provisioning management system 110 may be communicatively coupled to, or may include, any suitable type of component or system, which may provide information or data to the provisioning management system 110 for managing the network device provisioning, and/or to perform one or more operations for assisting the provisioning management system 110 in operation.

Example Operations for Managing Network Device Provisioning

In the following, several example operations performed by the provisioning management system of example embodiments of the present disclosure are described. It can be understood that at least a portion of the operations described herein may be performed by at least one processor (e.g., processor 112) of the provisioning management system (e.g., system 110). According to embodiments, at least one storage medium or memory storage (e.g., storage 114) may store computer-executable instructions, and the at least one processor may be communicatively coupled to the memory storage/storage medium and may be configured to execute the instructions to perform one or more operations described herein.

Figure 2:
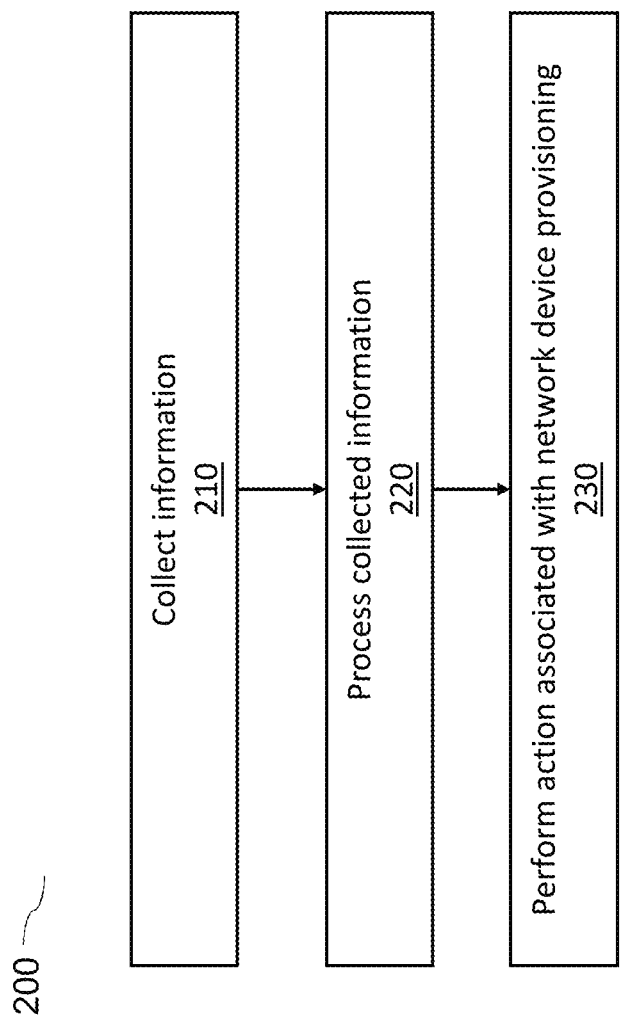
FIG. 2 illustrates a flow diagram of a general method for managing provisioning of the one or more network devices, according to one or more embodiments.

For instance, FIG. 2 illustrates a flow diagram of a general method 200 for managing provisioning of one or more network devices, according to one or more embodiments. One or more operations in the method 200 may be performed by the at least one processor 112 of the provisioning management system 110.

Referring to FIG. 2, at operation 210, the provisioning management system 110 may be configured to collect information. Specifically, the at least one processor 112 of the provisioning management system 110 may be configured to collect information from one or more information resources (e.g., information resources 120). For instance, the processor 112 may collect the information from the one or more information resources via a communication interface (e.g., interface 111) of the provisioning management system 110 and/or via an input/output component (e.g., component 113) of the provisioning management system 110. The one or more information resources may include a network planning system, a ticket management system, a user equipment, a user management system, or the like, as described above with reference to FIG. 1.

According to embodiments, the at least one processor 112 may be configured to access the one or more information resources via one or more APIs and may extract or collect the information from the one or more information resources by, for example, sending one or more API calls or API requests to the one or more information resources.

The information received by the at least one processor 112 may include information associated with various stages of the network device provisioning, such as (but are not limited to): information of a location or a site in which the one or more network devices would be deployed (e.g., name, site type, latitude, longitude, address, etc.), planning or design information (e.g., plan image, information of involved network device(s), etc.), information of one or more associated projects such as pending/delayed/completed/abandoned projects in the site or projects in which the user involved (e.g., project status, planned/baseline date, actual/projected date, stage, etc.), information of associated documents (e.g., document of associated project(s), document of associated location/site, etc.), information of one or more associated tickets (e.g., ticket ID, ticket description, severity, ticket status, ticket category, etc.), information of device commissioning (e.g., type of triggers involved, commissioning status, commissioning time, etc.), information of the provisioning progress of network device 140 (e.g., provisioning status, device serial number, connected network device(s), progress chart, progress history, etc.), information of the user (e.g., role of the user, granted access privileges, projects associated with the user, information of interest, preferred presentation style, etc.), and/or any other suitable information. Further, it can be understood that the information may be provided in the form of raw data, metadata, and/or in any other suitable format.

Referring still to FIG. 2, at operation 220, the provisioning management system 110 (or the at least one processor 112 associated therewith) may be configured to process the collected information. Accordingly, at operation 230, the provisioning management system 110 (or the at least one processor 112 associated therewith) may be configured to perform one or more actions associated with network device provisioning. Several examples of processes and actions in operations 220-230 are described in the following with reference to FIG. 3 and FIG. 4.

Figure 3:
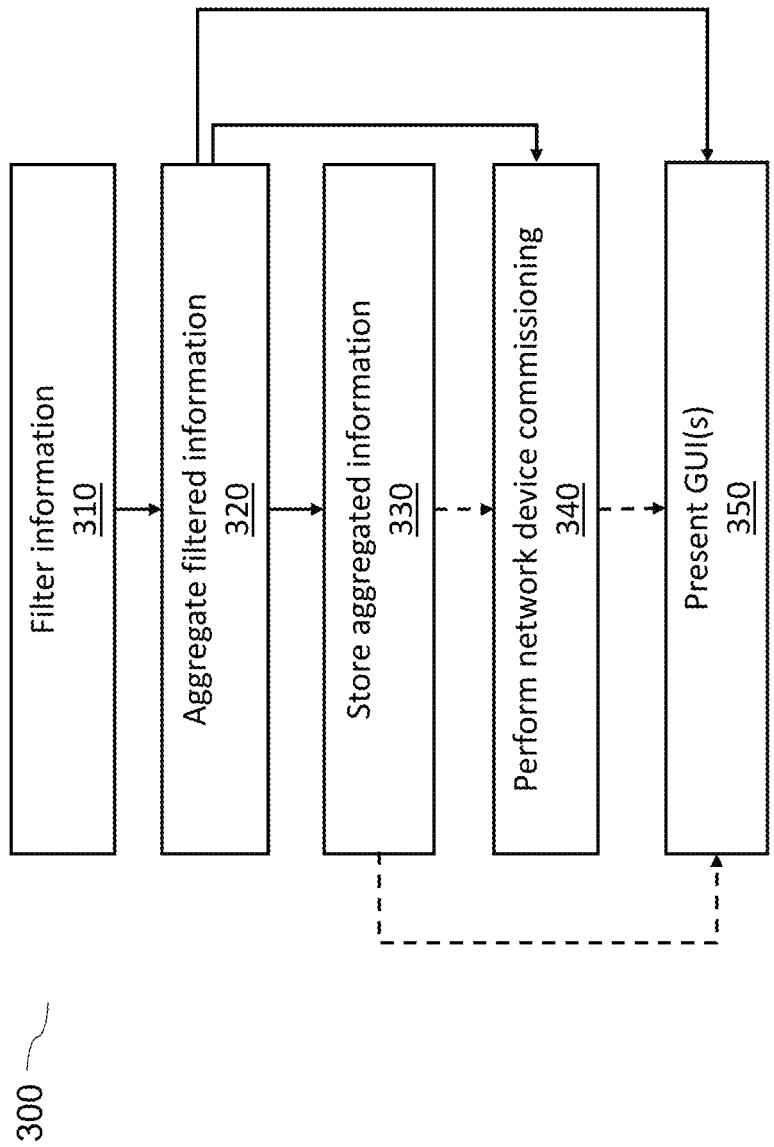
FIG. 3 illustrates a flow diagram of an example method for processing the collected information and for performing at least one action for managing the network device provisioning, according to one or more embodiments.

Referring first to FIG. 3, which illustrates a flow diagram of an example method 300 for processing the collected information and for performing at least one action for managing the network device provisioning, according to one or more embodiments. Operations 310-320 in the method 300 may be part of the operation 220 in the method 200, and operations 330-350 may be part of the operation 230 in the method 200. One or more operations in the method 300 may be performed by the at least one processor 112 of the provisioning management system 110.

At operation 310, the at least one processor 112 may be configured to filter the information (e.g., information collected at the operation 210 in the method 200, etc.). According to embodiments, the at least one processor 112 may filter the information according to one or more information categories. For instance, the at least one processor 112 may filter the information according to one or more of the following information categories: network device type, site information, project information, document information, ticket information, auto-commissioning information, provisioning stage, previously received information, and any other suitable information category. By way of example, the at least one processor 112 may determine, from among the collected information, which information is associated with which of the one or more information categories, and may then remove information which are non-associated with the one or more information categories thereafter.

Alternatively or additionally, the at least one processor 112 may be configured to filter the information when collecting the information. For instance, the at least one processor 112 may scan or analyze the information available from the information resources, may determine which of the available information is associated with the one or more information categories, and may simply extract or obtain the information associated with the one or more information categories from the information resources.

In this regard, it can be understood that, in addition to filtering the collected information according to one or more information categories, the at least one processor 112 may also filter the information according to other factor(s) or parameter(s). For instance, the at least one processor 112 may determine, based on previously obtained information (e.g., information stored in one or more storage mediums), which of the collected information (or information to-be collected) is new/updated and which is redundant/duplicated, and may filter the redundant/duplicated information such that only new or updated information will be maintained (or be collected). By way of example, during the filtering operation, the at least one processor 112 may compare the size of the information having the same descriptions/ID/title to determine whether or not the information may be the same or different, may compare the time stamp of said information to determine which of the information are more up-to-date, may perform a content comparison to determine the differences and similarity of the information, or the like.

Accordingly, at operation 320, the at least one processor 112 may be configured to aggregate the filtered information. According to embodiments, the at least one processor 112 may aggregate the filtered information according to the one or more information categories. For instance, the at least one processor 112 may classify, categorize, sort, arrange, group, combine, and/or assemble the filtered information (e.g., the remaining information after the filtering operation in operation 310) according to the associated information categories.

By way of example, assuming that the filtered information comprises a first information collected from a first information resource and a second information collected from a second information resource, both of the first information and the second information contains information associated with a first information category and information associated with a second information category. In this regard, the at least one processor 112 may extract the information associated with the first information category from the first information and the second information, and may aggregate (e.g., group, combine, etc.) the extracted information. Similarly, the at least one processor 112 may extract the information associated with the second information category from the first information and the second information, and may aggregate the extracted information thereafter. In this way, information collected from different information resources may be properly classified, categorized, grouped, or the like, according to the respective information category.

According to embodiments, during aggregating the information, the at least one processor 112 may be configured to enrich the information. For instance, the at least one processor 112 may combine information obtained from multiple information resources for improving information completeness, for correcting misspellings or typographical errors in the information, for improving readability of the information, or the like. In this way, the aggregated information may be more accurate, more complete, and more updated, as compared to the information provided by the separated and individual information resources.

Upon filtering and aggregating the information collected from the one or more information resources 120, the at least one processor 112 may be configured to perform one or more of the operations 330-350 as described in the following. It can be understood that the at least one processor 112 may perform one or more of the operations 330-350 in any suitable manner. For example, the processor 112 may perform more than one of operations 330-350 in parallel, may perform one operation after another, or in any suitable sequential manner.

Referring to FIG. 3, at operation 330, the at least one processor 112 may be configured to store the aggregated information. For instance, the at least one processor 112 may store the aggregated information into one or more storage mediums, such as at least one memory storage in the provisioning management system 110 (e.g., storage 114) and/or at least one storage external from the provisioning management system 110 (e.g., a server in a data center, etc.).

According to embodiments, the at least one processor 112 may be configured to store the aggregated information according to the respective information category. For instance, the at least one processor 112 may store the information associated with a first type of network device (e.g., small cell device, etc.) in a first storage (or a first partition of the storage) and may store the information associated with a second type of network device (e.g., floor switch, etc.) in a second storage (or a second partition of the storage). As another example, the at least one processor 112 may store the information associated with a first information category (e.g., site information) in the first storage (or the first partition of the storage) and may store the information associated with a second information category (e.g., project information) in the second storage (of the second partition of the storage). Alternatively or additionally, the at least one processor 112 may map or assign the aggregated information an identifier (ID) defining the respective information category(s), and may provide the aggregated information with the assigned ID to the one or more storage mediums. Accordingly, the one or more storage mediums may, based on the assigned ID, store the aggregated information according to the respective information category.

On the other hand, at the operation 340, the at least one processor 112 may be configured to perform commissioning of the one or more network devices 140. Specifically, the at least one processor 112 may generate, based on the aggregated information, one or more triggers for commissioning the one or more network devices 140, and may output the one or more triggers for auto-commissioning the one or more network devices 140. Further descriptions of example device commissioning operations are provided below with reference to FIG. 4.

Meanwhile, at the operation 350, the at least one processor 112 may be configured to present one or more graphical user interfaces (GUIs). For instance, the at least one processor 112 may be configured to generate the one or more GUIs based on the aggregated information, and may present the one or more GUIs to the associated user(s), throughout various stages of network device provisioning.

According to embodiments, the at least one processor 112 may present only the associated information to the user. For instance, the at least one processor 112 may be communicatively coupled to at least one user management system (e.g., via communication interface of the provisioning management system 110, etc.), and may be configured to interoperate with the user management system. Upon determining an access from an unauthorized or unauthenticated user (e.g., a non-registered user, a non-login user, etc.), the provisioning management system 110 may direct the user to the user management system for authorization and authentication. Upon successful authorization and authentication, the user management system may redirect the user back to the provisioning management system 110, along with one or more information associated with the user, such as: name/ID of the user, role of the user, privilege access level, associated project(s), information of interest, preferred presentation style, or the like. Accordingly, the provisioning management system 110 may generate (based on the user information) the appropriate GUI(s) containing information and functional/interactive element(s) associated with the user. Accordingly, the GUI(s) presented to the user may be customized for the user, while maintaining the standardization and unity in the information detail level and the like. Several examples of presented GUI are described below with reference to FIG. 7 to FIG. 15.

Figure 4:
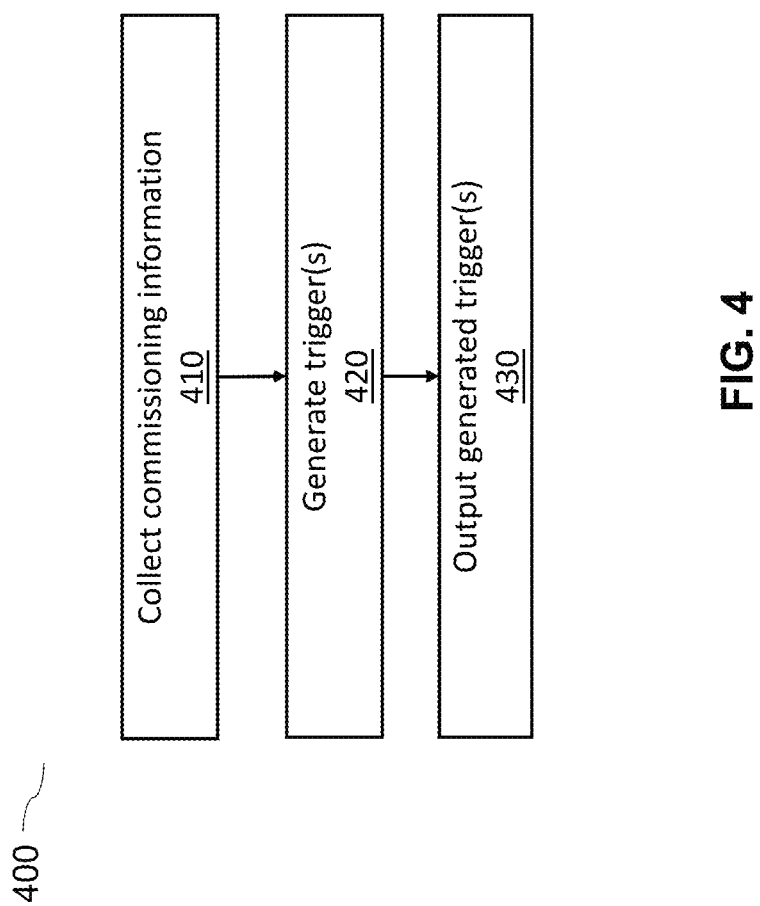
FIG. 4 illustrates a flow diagram of an example method for commissioning the one or more network devices, according to one or more embodiments.

Referring next to FIG. 4, which illustrates a flow diagram of an example method 400 for commissioning one or more network devices, according to one or more embodiments. One or more operations of method 400 may be part of the operation 340 in the method 300, and may be performed by the at least one processor 112 of the provisioning management system 110.

In this regard, commissioning of a network device may refer to the operation of verifying the installation and deployment of the network device and activating the network device upon verification(s). For instance, upon completion of installation of the network device 140, an acceptance test procedure (ATP) may be initiated to verify that the network device is being installed and deployed as per requirement (e.g., consistent with network design, satisfy safety requirement, etc.). Subsequently, upon completion of the ATP, the network device may be activated (e.g., powered-on, etc.) and be brought to operation.

The method 400 may be performed automatically by the provisioning management system 110, upon determining completion of one or more specific stages of network device provisioning. For instance, based on determining (e.g., from the information collected from the information resources, etc.) that installation of the network device 140 is completed, the provisioning management system 110 may automatically initiate the commissioning of the network device 140 by performing one or more operations of the method 400.

Referring to FIG. 4, at operation S410, the at least one processor 112 may be configured to collect information associated with commissioning of the one or more network devices 140 (may be referred to as "commissioning information" herein). The process of obtaining said commissioning information may be similar with those described above with reference to FIG. 2 and FIG. 3, thus redundant descriptions associated therewith may be omitted below for conciseness.

The commissioning information may include (but is not limited to):

Internet Protocol (IP) transport information, such as information of physical site connectivity between the network device and a server of a data center (e.g., a server to which the network device connected to and from which the network device obtain data, etc.), and/or the like;

Acceptance test procedure (ATP) information, such as device information (e.g., device serial number, media access control (MAC) address, etc.), site information (e.g., site name, site acquisition request form (SARF) ID, latitude, longitude, address, etc.), and/or the like;

Day 1 configuration information, such as network service deployment information, activation status of the network device, network device license information, and/or the like; and/or Day 2 configuration information, such as network device configuration, statuses of the network device (e.g., upload, validation, activation, etc.), and/or the like.

At operation 420, the at least one processor 112 may be configured to generate one or more triggers for commissioning the one or more network devices. The one or more triggers may include a IP transport trigger for initiating an IP transport operation, an ATP trigger for initiating an ATP, an activation trigger for activating or power on a network device, or the like.

According to embodiments, the at least one processor 112 may generate the one or more triggers by aggregating the information collected in the operation 410 according to one or more trigger templates. For instance, when generating an IP transport trigger, the at least one processor 112 may obtain, from one or more storage mediums communicatively coupled with the at least one processor 112 (e.g., storage 114, etc.), a template file defining one or more fields of information required for generating the IP transport trigger, such as: device type, site address, server ID, terminating node, and any other suitable field of information. Accordingly, the at least one processor 112 may extract the required information from the collected information, and may then combine the extracted information according to the template file to thereby produce the IP transport trigger. It can be understood that other types of trigger (e.g., ATP trigger, etc.) may be generated by the at least one processor 112 in the similar manner. Further, it is contemplated that the one or more triggers may be generated in any suitable computer-readable format, such as JavaScript Object Notation (JSON) format, or the like.

Accordingly, at operation 430, the at least one processor 112 may be configured to output the generated one or more triggers for commissioning the one or more network devices. For instance, the at least one processor 112 may output the one or more triggers to at least one device management system (e.g., device management system 130). Subsequently, the device management system may be configured to perform the commissioning based on the received one or more triggers. Alternatively or additionally, the at least one processor 112 may output the one or more triggers to the one or more network devices (e.g., network device 140), and the one or more network devices may perform self-commissioning and/or may perform commissioning for other network device(s), based on the one or more triggers.

According to embodiments, the provisioning management system 110 (or the at least one processor 112 associated therewith) may output the one or more triggers automatically (e.g., in response to an event, etc.). For instance, the at least one processor 112 may, upon determine that a threshold or a condition is satisfied (e.g., a ratio of network devices has been installed, etc.), automatically output the one or more triggers to perform commissioning on the associated network device(s). Alternatively or additionally, the at least one processor 112 may output the one or more triggers in response to a user input. For instance, the at least one processor 112 may, upon generating the one or more triggers, present the associated information to the associated users (e.g., via one or more GUIs), and the associated users may quickly review and send the trigger(s) by simply interacting (e.g., one-click, etc.) with the interactive element(s) included in the one or more GUIs.

It can be understood that the operations described hereinabove are merely examples of possible embodiments of the present disclosure, and are not intended to be exhaustive or to limit the scope of the present disclosure. Specifically, one or more of above described operations may be appropriately modified or performed in a different manner, without departing from the scope of the present disclosure.

For instance, at least a portion of the commissioning information required in the operation 420 may have been previously collected. By way of example, a portion of information required for generating the one or more triggers may have been previously collected at the operation 210 in the method 200 of FIG. 2, may have been previously aggregated at the operation 320 in the method 300 of FIG. 3, may have been previously stored in one or more storage mediums at the operation 330 in the method 300 of FIG. 3, or the like. In this regard, the at least one processor may simply obtain and utilize said information to generate the one or more triggers, without performing the operation 410.

Further, it can also be understood that the at least one processor 112 may perform any other suitable action(s) throughout the network device provisioning. For instance, the at least one processor 112 may automatically generate one or more notifications during various stages or conditions.

In some implementations, the at least one processor 112 may, based on determining that a specific stage of network device provisioning is completed, generate a notification message and provide the same to the user(s) associated with the subsequent stage. By way of example, upon completion of network design stage, the at least one processor 112 may automatically determine, from the finalized network design, materials or network devices required and may provide the notification message including information of said materials/devices to a user in-charge of procurement activity. Similarly, the at least one processor 112 may automatically generate and provide one or more notifications upon determining an update in an information, upon receiving a status update, upon receiving a notification from another system (e.g., ticket management system, user management system, etc.), upon determining an issue such as a failure in commissioning a network device, or the like.

Several additional examples of actions or operations which may be performed by the at least one processor 112 are described below with reference to FIG. 6.

In view of the above, the utilization of provisioning management system throughout various stages of network device provisioning may effectively address the shortcomings of the related art, and may achieve at least the technical advantages, as described hereinabove.

Example Implementation: Managing Network Device Provisioning for Small Cell

System, method, device, and the like, of the example embodiments of the present disclosure as described herein may be deployed or be utilized for managing network device provisioning in any suitable type of network configuration. By way of example, the provisioning management system 110, as well as the components and operations associated therewith, as described herein may be applicable for managing network device provisioning for a small cell.

In this regard, a small cell (SC) may refer to a radio access point with low radio frequency (RF) power output, footprint, and range. There may be various types of small cell, with varying range, power level and/or form factor, according to requirement. For instance, a small cell may be utilized for indoor residential-level usage, may be utilized in a building for business/enterprise-level usage, may be utilized for urban or rural outdoor usage, or the like. Generally, a small cell complements a network to improve coverage, to add targeted capacity, and to support new services and user experiences, and the implementation of small cell is particularly useful for users in urban areas (e.g., office buildings, shopping malls, etc.) that require high-capacity network service while having weak cellular signal.

Figure 5:
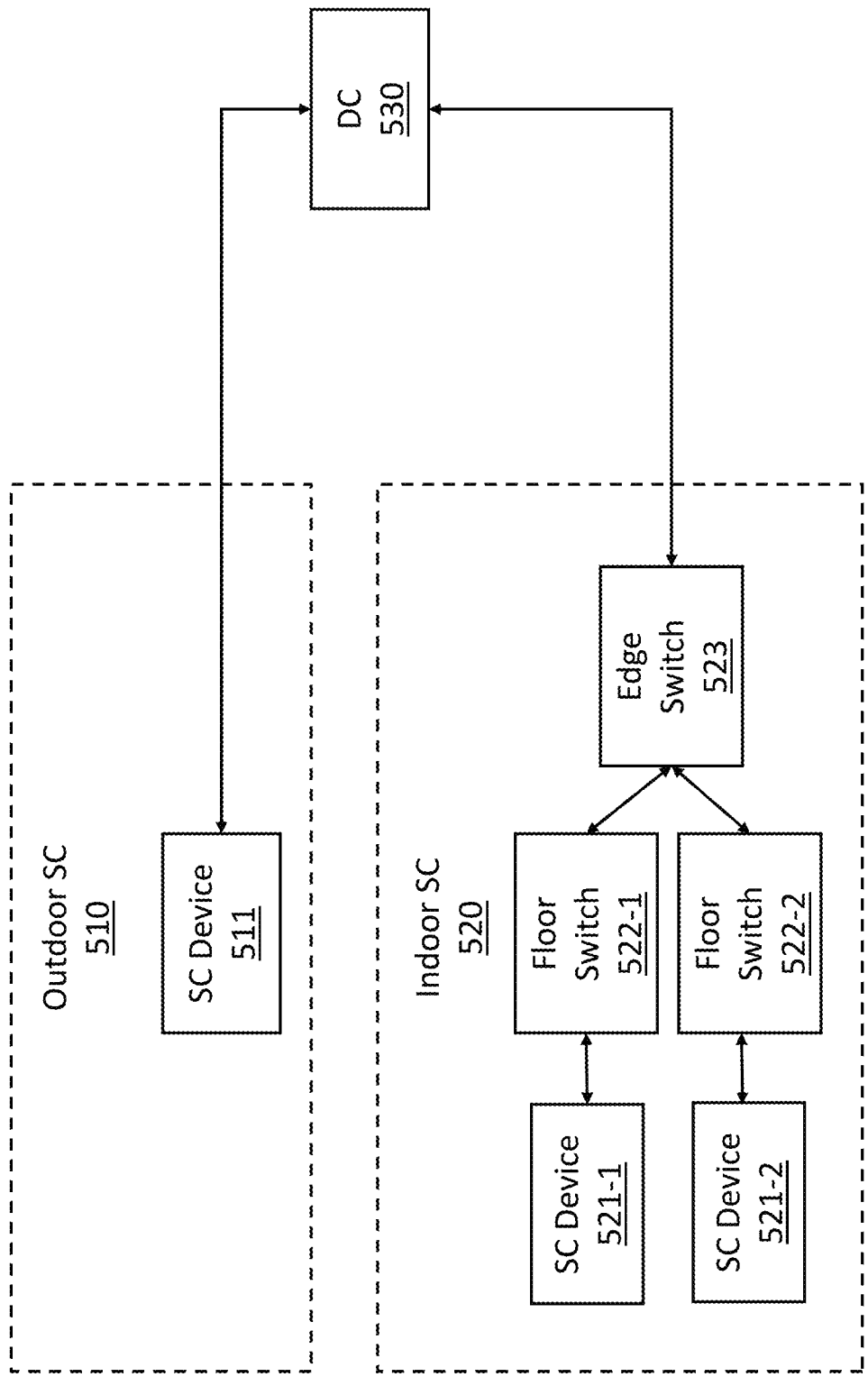
FIG. 5 illustrates a block diagram of an example system configuration of a small cells network, according to one or more embodiments.

FIG. 5 illustrates a block diagram of an example system configuration of a small cells network, according to one or more embodiments.

As illustrated in FIG. 5, a plurality of small cells (e.g., outdoor SC 510, indoor SC 520, etc.) may be communicatively coupled to a datacenter (DC) 530. In this regard, the DC 530 may have one or more servers hosted therein, from which the plurality of small cells obtain data or information. For instance, the DC 530 may include one or more servers storing one or more virtualized network functions (VNFs), and the plurality of small cells may communicate with the DC 530 to utilize the one or more VNFs so as to provide one or more network services to a user.

It can be understood that one or more additional components may be involved, without departing from the scope of the present disclosure. For instance, one or more user equipment may be communicatively coupled to at least one of the outdoor SC 510 and the indoor SC 520, the DC 530 may be communicatively coupled to one or more core networks (e.g., 4G evolved packet core (EPC) network, 5G Core (5GC) network, etc.), the DC 530 may include a plurality of datacenters located at different locations, or the like. Further, it is contemplated that DC 530 may include any suitable hardware component, software component, or a combination thereof, which may be arranged or configured in any suitable manner, such as a top of rack (ToR) configuration, a middle of row (MoR) configuration, an end of row (EoR) configuration, or the like.

It can also be understood that one or more systems or components in FIG. 1 may be implemented in the DC 530. For instance, according to embodiments, the provisioning management system 110 may be hosted or deployed in one or more servers of DC 530 and may be utilized to manage provisioning of network devices in outdoor SC 510 and/or indoor SC 520.

The outdoor SC 510 may be any type of small cell suitable to be implemented outdoor, such as a small cell deployed on city streetlights, a small cell deployed in a park, a small cell deployed in public transport station, or the like. According to embodiments, the outdoor SC 510 may include at least one SC device 511. The SC device 511 may include at least one radio unit (RU), at least one distributed unit (DU), and/or any suitable device(s) which may constitute an outdoor small cell. It can be understood that the outdoor SC 510 may include more than one SC device 511 as per requirement, without departing from the scope of the present disclosure.

The indoor SC 520 may be any type of small cell suitable to be implemented indoor, such as a small cell for a building, a small cell for a shop, a small cell for a stadium, or the like. In the example illustrated in FIG. 5, the indoor SC 520 may be implemented in a building including multiple floors. In this regard, each floor of the building may have at least one SC device (e.g., SC device 521-1, SC device 521-2, etc.) deployed therein, wherein the at least one SC device may be communicatively coupled to a floor switch (e.g., floor switch 522-1, floor switch 522-2, etc.). Further, each of the floor switches in the building may be communicatively coupled to an edge switch 523, wherein the edge switch 523 is communicatively coupled to the DC 530.

Accordingly, the SC device(s) deployed in the specific floor of the building may be activated or commissioned via interacting with the edge switch 523. For instance, a power on notification may be provided to the edge switch, the edge switch may appropriately route the power on notification to the associated floor switch, and the associated floor switch may power on the associated SC device(s). It can be understood that the edge switch 523 and/or the floor switches 522-1 and 522-2 may be activated or commissioned in a similar manner. Further, it can be understood that the indoor SC 520 may include additional network devices, such as a building switch, a signal transfer unit (STU), a rapid deployment unit (RDU), and the like, without departing from the scope of the present disclosure.

The network devices (e.g., SC device, floor switch, etc.) may be communicatively coupled to each other and/or communicatively coupled to the DC 530 (or to one or more components included therein) via a wired connection, such as any suitable type of optical fiber connection (e.g., Dark fiber, etc.).

Merely for descriptive purpose, example embodiments of the present disclosures may be described herein with reference to network device provisioning for a small cell, although it is contemplated that example embodiments of the present disclosure may be similarly applicable to any other suitable types of network cells, such as a macro cell, a femto cell, or the like.

Example Workflow and Operations of Network Device Provisioning

As described above, the network device provisioning may include various stages and may involve multiple users. In the following, examples of stages of network device provisioning, users involved therein and the example activities associated therewith, as well as several example use cases in which the provisioning management system 110 may be utilized, are described below with referent to FIG. 6.

Figure 6:
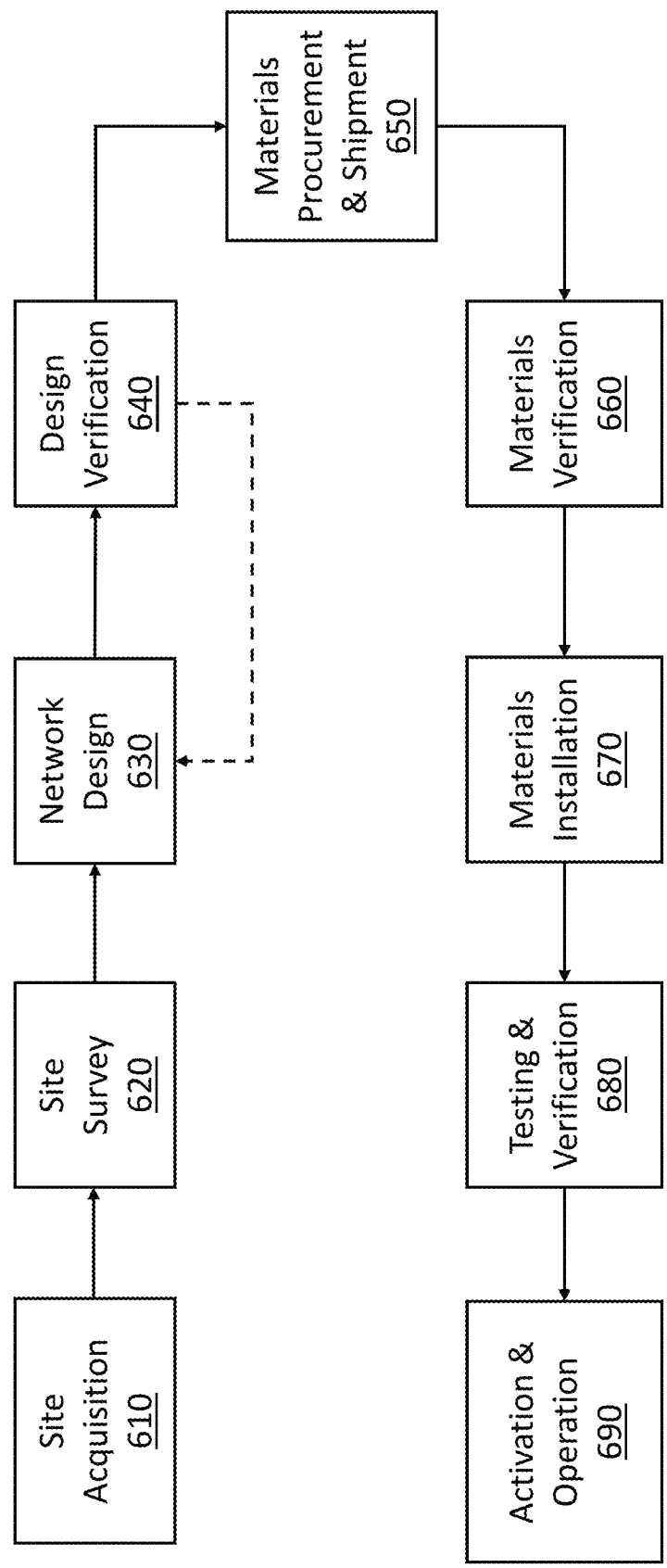
FIG. 6 illustrates a block diagram of a workflow of various stages throughout a network device provisioning, according to one or more embodiments.

In this regard, FIG. 6 illustrates a block diagram of an example workflow of various stages throughout a network device provisioning, according to one or more embodiments. It can be understood that the network device provisioning may include more or less stages, and a portion of the stages may occur in any suitable sequential manner, such as occur simultaneously to one another, or the like. Further, it can be understood that, throughout the stages of network device provisioning, the provisioning management system 110 (or the at least one processor 112 associated therewith) may perform one or more actions or operations described above with reference to FIG. 2 to FIG. 5.

Referring to FIG. 6, at stage 610, the network device provisioning may be initiated with site acquisition procedure. Users involved in this stage may include: network planner, network operator or provider, owner or manager of the site candidates, or the like. Further, stage 610 may include operations such as: selection of site candidate(s), initiating contact with owner(s) of selected site candidate(s), preparing agreement (or similar document), obtaining approval from the owner(s), obtaining site materials (e.g., drawing, information of deployed network devices, constraints of the site, etc.), or the like.

At this stage, the communication among the users may be performed and managed via the provisioning management system 110. For instance, the provisioning management system 110 (or the at least one processor 112 associated therewith) may provide one or more GUIs including available sites for the network planner selection, may receive one or more communication content (e.g., text message, voice recording, etc.) from the network planner and may generate one or more communications message to the site owner based thereon, may record the communication among the network planner and the site owner, may receive materials and information from the network planner (e.g., proposal, agreement, etc.) and/or from the site owner (e.g., site floor plan, budget information, etc.), may store/process the materials/information, or the like. The provisioning management system 110 may be utilized for the similar purpose in one or more of other stages of network device provisioning, thus redundant descriptions associated therewith may be omitted in below for conciseness.

Upon completion of stage 610, the network device provisioning may proceed to stage 620. At this stage, one or more site surveys (e.g., general site survey, specific site survey, etc.) may be performed by the users, which may include a network designer, the network planner, or the like. Generally, the users may visit the site to understand the actual infrastructure of the site, and may perform one or more field tests or walk tests when required. The information/materials involved at this stage may include: SARF ID, building actual information, field test/walk test results, and the communication among the users. In this regard, in addition to managing the communication among users and information/materials involved (as described above with reference to stage 620), the provisioning management system 110 (or the at least one processor 112 associated therewith) may also interoperate with the test equipment and/or survey equipment (e.g., via API calls, etc.), such that the information (e.g., test results, photo of actual site, etc.) may be automatically collected and managed by the provisioning management system 110.

Upon completion of stage 620, the network device provisioning may proceed to stage 630. At this stage, the network may be designed by the users, which may include, for example, the network designer, the network planner, or the like. For instance, the network design may begin with an initial floor wise design, which include initial information of materials required for constructing the design network. By way of example, the network design may be a floor wise design including initial bill of material (BOM). The users may utilize a network planning system (e.g., radio planning system, etc.) to design the network. Thus, at this stage, the provisioning management system 110 (or the at least one processor 112 associated therewith) may interoperate with the network planning system to provide the network planning system the required information (e.g., SARF ID, site information, site floor plan drawing, etc.) for designing the network, as well as to receive and manage the information associated with the network design (e.g., design plan, BOM information, etc.) provided by the network planning system.

Upon completion of stage 630, the network device provisioning may proceed to stage 640. At this stage, the network design are verified by the users, which may include: the network planner, the site owner, technical personnel or engineer, or the like. For instance, the provisioning management system 110 (or the at least one processor 112 associated therewith) may collect the information associated with the network design from the network planning system, and may provide the same to the users for verification. The users may review said information for verifying design feasibility, ensuring that the design complies to safety requirement, or the like. According to embodiments, the users may perform a technical site survey to verify the network design on site. In that case, the provisioning management system 110 may be utilized in a similar manner as described above with reference to operation 620.

Further, upon reviewing the information, the users may approve/reject the network design via the provisioning management system 110 (e.g., via interacting with interactive element(s) included in one or more GUIs presented by the at least one processor 112, etc.), and the provisioning management system 110 (or the at least one processor 112 associated therewith) may generate a notification defining the verification outcome along with the user's feedback/comments, and provide the same to, for example, the network planning system, the user equipment of the network designer, or the like. In this regard, if the network design is rejected, the network device provisioning may return to stage 630 to redesign the network or revise the design of the network.

On the other hand, if the network design is approved, the provisioning management system 110 (or the at least one processor 112 associated therewith) may initiate stage 650 by, for example, providing the information of materials associated with the verified design to the users involved in stage 650. For instance, the provisioning management system 110 (or the at least one processor 112 associated therewith) may provide the BOM or any other information of materials involved in the verified design, to said users. According to embodiments, based on determining that a first portion of the network design is approved while a second portion of the network design is rejected, the provisioning management system 110 (or the at least one processor 112 associated therewith) may provide the information of materials involved in the first portion of the network design to the users involved in stage 650, and may provide information of the second portion of the network design to the users involved in stage 630.

The users involved in stage 650 may include a user of procurement team, a material provider/vendor/manufacture, a shipment party, or the like. In this regard, when providing the information of the materials to be procured, the provisioning management system 110 (or the at least one processor 112 associated therewith) may also aggregate information of the potential material providers (e.g., price offer, material in-stack status, provider background, etc.) and provide the same to the user of the procurement team, such that said user may simply utilize the provisioning management system 110 to select and to communicate with the appropriate material provider. According to embodiments, the provisioning management system 110 (or the at least one processor 112 associated therewith) may receive, from the user, an order for a material. In that case, the provisioning management system 110 (or the at least one processor 112 associated therewith) may compare the information of the material included in the order with the information of the materials involved in the approved network design (e.g., number of materials, type of materials, etc.), which may effectively determine any potential error before actually placing the order to the material provider.

On the other hand, upon receiving the order from the provisioning management system 110, the material provider may prepare the material and ship the material accordingly. The associated information (e.g., order number, shipment status, tract number, invoice document, etc.) may be provided directly to the provisioning management system 110, or may be uploaded into a system or platform of the material provider (in that case, the provisioning management system 110 (or the at least one processor 112 associated therewith) may communicate with the system/platform to collect said associated information). The provisioning management system 110 (or the at least one processor 112 associated therewith) may generate and update the information on the one or more GUIs in real-time or near real-time, may generate a notification to notify the associated user whenever determining an update in the order or shipment, or the like.

Upon receiving the shipped materials, the network device provisioning may proceed to stage 660. At this stage, the received materials may be verified by the users before installation. The users involved in this stage may include the network planner, technician from a subcontractor, a specialist appointed by the site owner, or the like. In this regard, the users may utilize the provisioning management system 110 to verify the received materials. For example, the user may utilize a computer software or application program to scan a code (e.g., bar code, QR code, etc.) printed on the packaging of the shipment, or the like, and the provisioning management system 110 (or the at least one processor 112 associated therewith) may automatically extract or collect the information of the ship materials from the computer software/application program (e.g., via API calls, etc.). Accordingly, the provisioning management system 110 (or the at least one processor 112 associated therewith) may compare the information of the shipped materials and the information of the procured materials and/or the information of the materials required in the designed network, to determine whether or not the shipped materials are consistent with the required materials.

Upon completion of stage 660, the network device provisioning may proceed to stage 670. At this stage, the users may install the verified materials on the site, according to the approved network design. The users involved in this stage may be the same with the users involved in stage 660. In this regard, the provisioning management system 110 may be utilized before, during, and/or after the installation of the materials. For instance, before installing the materials, the users may capture a photo of the installation location and the provisioning management system 110 (or the at least one processor 112 associated therewith) may automatically collect and record the photo from the users (e.g., via API calls as described above, etc.). Further, during installation of the materials, the users may access the provisioning management system 110 to review (via one or more GUIs presented therefrom) the required information, such as: site information, approved network design, remarks provided by other users, or the like. Whenever the users encounter any issues, the users may effectively and quickly communicate with the associated users via the provisioning management system 110. Furthermore, after installation of the materials, the users may capture a photo of the installation location and the provisioning management system 110 (or the at least one processor 112 associated therewith) may automatically collect and record the photo from the users. In this regard, the provisioning management system 110 (or the at least one processor 112 associated therewith) may automatically compile a before- and after-installation photo of the installation location and present the same to the users via one or more GUIs. Further still, the provisioning management system 110 (or the at least one processor 112 associated therewith) may receive a report from the users, and may share the reports to all associated users thereafter.

Upon completion of stage 670, the network device provisioning may proceed to stage 680 and then to stage 690. Stage 680 may involve testing and verification procedures, while stage 690 may involve activation and operation of the installed network device(s). In this regard, stage 680 and stage 690 may be collaboratively referred to as "commissioning stage", in which the commissioning on the installed network device(s) is performed in a similar manner as described above (e.g., described with reference to FIG. 3 and FIG. 4, etc.). Thus, redundant descriptions associated therewith may be omitted hereinbelow for conciseness.

In view of the above, the provisioning management system 110 may be utilized by multiple users throughout different stages of network device provisioning, which may improve the communication and collaboration efficiency among users, reduce the user's burden in managing the involved information, provide quick (e.g., real-time, near real-time, etc.) information update, and enable auto- or semi-auto commissioning of network devices.

Examples of Graphical User Interface (GUI)

As described hereinabove, the at least one processor 112 of the provisioning management system 110 may generate and provide one or more GUIs to the associated user(s) throughout various stages of network device provisioning. In the following, several examples of GUI which may be generated and presented by the at least one processor 112 are described with reference to FIG. 7 to FIG. 15.

In this regard, it can be understood that the GUIs described herein are merely examples for illustrative and descriptive purposes, and are not intended to be exhaustive or to limit the scope of the present disclosure. Specifically, the GUIs may include more or less components (e.g., information, interactive elements, etc.), may be arranged in different manner, or the like, without departing from the scope of the present disclosure.

Referring first to FIG. 7, which illustrates an example GUI 700 for presenting site information, according to one or more embodiments. As illustrated in FIG. 7, the GUI 700 may include a first portion 710, a second portion 720, a third portion 730 and a fourth portion 740.

The first portion 710 may include the title of the information presented in the GUI 700 (e.g., "Site 1"), which may be associated to information such as the site name, project title, or the like. Further, the first portion 710 may include an interactive element 711 which, when being interacted by the user, close the GUI 700 and/or redirect the user to a specific system (e.g., a log-out page presented by the user management system, etc.).

The second portion 720 may include a plurality interactive texts 721, each of which is associated with a respective information category. In this example embodiment, the second portion 720 includes interactive texts associated with the categories of "DETAIL", "SITE DATA", "PROJECT", "DOCUMENT", "TICKET", "INVENTORY", and "AUTO-COMMISSIONING", although it can be understood that the second portion 720 may be arranged in any other suitable manners. For instance, the second portion 720 may include additional interactive text(s) associated with additional information categories (e.g., "PHOTO", "HISTORY", "REMARK", etc.), each of the information category may be presented in a different manner (e.g., different labelling, different position, etc.), or the like, without departing from the scope of the present disclosure.

Each of the plurality of interactive texts 721 may, when being interacted by the user, provide an associated user input to the at least one processor 112 of the provisioning management system 110 such that the at least one processor 112 may generate and present the associated GUI to the user. The selected interactive text may be presented in a distinguish manner from the non-selected interactive texts. For instance, in the example illustrated in FIG. 7, the interactive text "DETAIL" is selected, and thus said interactive text is presented in larger font size and in bold. It can be understood that the text of the selected information category may be presented in any other suitable distinguish manner, such as: highlighted, presented in different font, or the like, without departing from the scope of the present disclosure.

The third portion 730 may include a sub-information category and an interactive element 731 which, when being interacted by the user, enable the user to edit or change the presentation of the GUI 700. For instance, the at least one processor 112 may, in response of determining a user interaction on the interactive element 731, present one or more additional GUIs to allow the user to change the information presented in one or more of portions 710-740 in the GUI 700, to allow the user to customize the presentation style of the GUI 700 (e.g., select additional information of interest, adjust the position of presented information, etc.), or the like.

Referring next to FIG. 8, which illustrates an example GUI 800 for presenting site data, according to one or more embodiments. The GUI 800 may be generated and presented by the at least one processor 112 of the provisioning management system 110, in response to a user interaction on the interactive text of the information category "SITE DATA" in the second portion 720 of the GUI 700. To this end, the GUI 800 may contain one or more features similar as the GUI 700 (e.g., both GUIs may include similar a first portion and a second portion, etc.), thus the redundant descriptions associated with the similar/repeated features may be omitted below for conciseness.

As illustrated in FIG. 8, the GUI 800 may include a third portion 830 and a fourth portion 840. The third portion 830 may include information defining the sub-category of the selected interactive text in the second portion (e.g., "SITE DATA"). In this example embodiment, the third portion 830 includes a description of "Building A>>Floors", which indicates to the user that the information currently presented in the GUI 800 are associated with the sub-category "Floors" of the site "Building A". In this regard, it can be understood that the site may include any other suitable sub-category, such as "Stairs", "Elevators", "Entrance Hall", "Machine Room", "Fireproof Water Tank", or the like, without departing from the scope of the present disclosure.

Further, the third portion 830 may include a plurality of interactive elements 831, each of which may, when being interacted by the user, trigger a respective action (e.g., present plan data, download the information currently presented in the GUI 800, manually refresh the GUI 800 to update the information presented therein, etc.), although it can be understood that the third portion 830 may include more or less interactive elements according to the requirement or the user's preference, without departing from the scope of the present disclosure.

Figure 9:
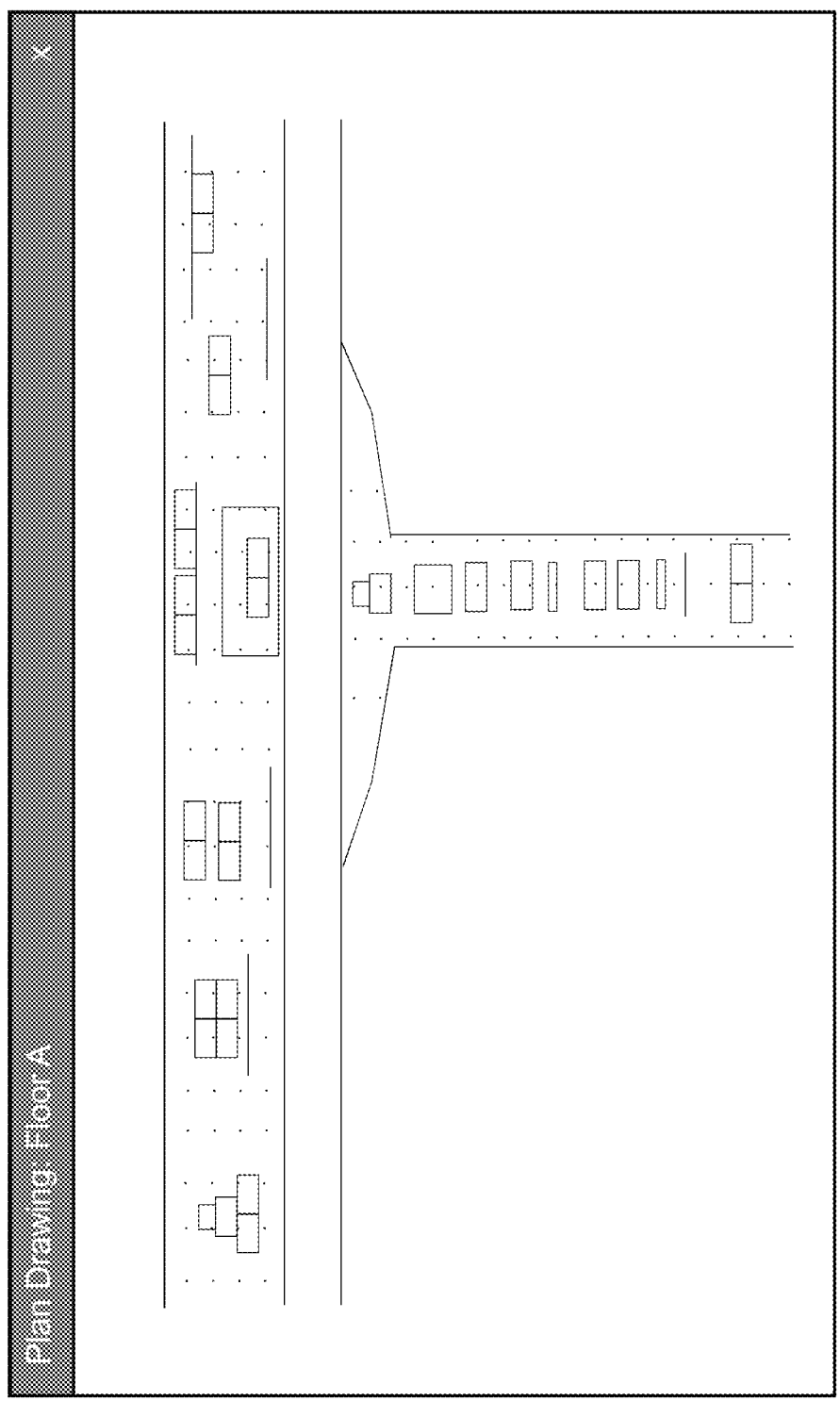
FIG. 9 illustrates an example GUI for presenting a plan drawing, according to one or more embodiments.

Referring to FIG. 9, which illustrates an example GUI 900 for presenting a plan drawing, according to one or more embodiments. GUI 900 may be generated by the at least one processor 112 of the provisioning management system 110 and be presented to the user in response to a user interaction on the respective interactive element 831 in the GUI 800 (e.g., "PLAN DATA" button, etc.). For instance, based on determining a user interaction on the "PLAN DATA" button, the at least one processor 112 may determine the category and the sub-category of information currently presented to the user in the GUI 800, may obtain the associated information from one or more storage mediums (e.g., storage 114, etc.), and may generate the GUI 900 based on the obtained information.

Referring back to FIG. 8, the fourth portion 840 may include information or data of the site. In the illustrated example, since the sub-category "Floors" has been selected, information associated with the floors of the site are presented in the fourth portion 840. Further, the fourth portion 840 may include an interactive elements 841 which, when being interacted by a user, present additional information associated with the corresponding sub-category (e.g., additional information of floor A, etc.) to the user.

Referring next to FIG. 10, which illustrates an example GUI 1000 for presenting information of one or more projects, according to one or more embodiments. The GUI 1000 may be generated and presented by the at least one processor 112 of the provisioning management system 110, in response to a user interaction on the interactive text of the information category "PROJECT" in the second portion of any of the previously described GUIs.

As illustrated in FIG. 10, the GUI 1000 may present information of one or more projects associated with the site, the user, or the like (e.g., on-going project, delayed project, completed project, etc.). In addition to the portions described above with reference to FIG. 7 to FIG. 8, the GUI 1000 may include an additional portion 1050, which may include indicators associated with each project status, and a plurality of interactive elements for enabling the user to customize the presentation of the information in the GUI 1000 (in case there are significant amount of available information). In this example embodiment, the indicators associated with the project statuses are presented in different patterns, although it may be understood that said indicators may be presented in any suitable distinguish manner, such as presented in different colors, or the like.

Referring next to FIG. 11, which illustrates an example GUI 1100 for presenting information of one or more documents, according to one or more embodiments. GUI 1100 may be generated and presented by the at least one processor 112 of the provisioning management system 110, in response to a user interaction on the interactive text of the information category "DOCUMENT" in the second portion of any of the previously described GUIs.

As illustrated in FIG. 11, the GUI 1100 may present information of one or more documents available to the user, and may include one or more interactive elements which, when being interacted by the user, enable the user to perform one or more actions on the respective document(s). For instance, the third portion 1130 of the GUI 1100 may include a check box which, when being interacted by the user (e.g., clicked by the user, etc.), automatically selected all of the available documents, such that the user may perform one or more actions to all available documents in parallel.

Additionally, the fourth portion 1140 of the GUI 1100 may include a plurality of check boxes, each of which associated with a particular document, such that the user may select one or a portion of the available documents to perform one or more actions thereon. Further the fourth portion 1140 may include interactive elements 1141 which, when being interacted by the user, causes the at least one processor to generate and present one or more additional GUIs to allow the user to select, specify, or the like, one or more intended actions. The actions which may be performed on the available documents may include: downloading the document(s), editing the document(s), removing the document(s), or the like.

Referring next to FIG. 12, which illustrates an example GUI 1200 for presenting information of one or more tickets, according to one or more embodiments. GUI 1200 may be generated and presented by the at least one processor 112 of the provisioning management system 110, in response to a user interaction on the interactive text of the information category "TICKET" in the second portion of any of the previously described GUIs. The GUI 1200 may be generated by the at least one processor 112 based on information provided to the provisioning management system 110 by a ticket management system.

As illustrated in FIG. 12, the GUI 1200 may present information of one or more tickets associated with the site, associated with the users, or the like. Further, the GUI 1200 may include a plurality of interactive elements which, when being interacted by the user, causes the at least one processor 112 to perform an associated action. For instance, upon determining a user interaction on the search button, the at least one processor 112 may update the GUI 1200 to include a search window, such that the user may insert one or more keywords for searching an intended ticket(s), or the like.

Figure 13:
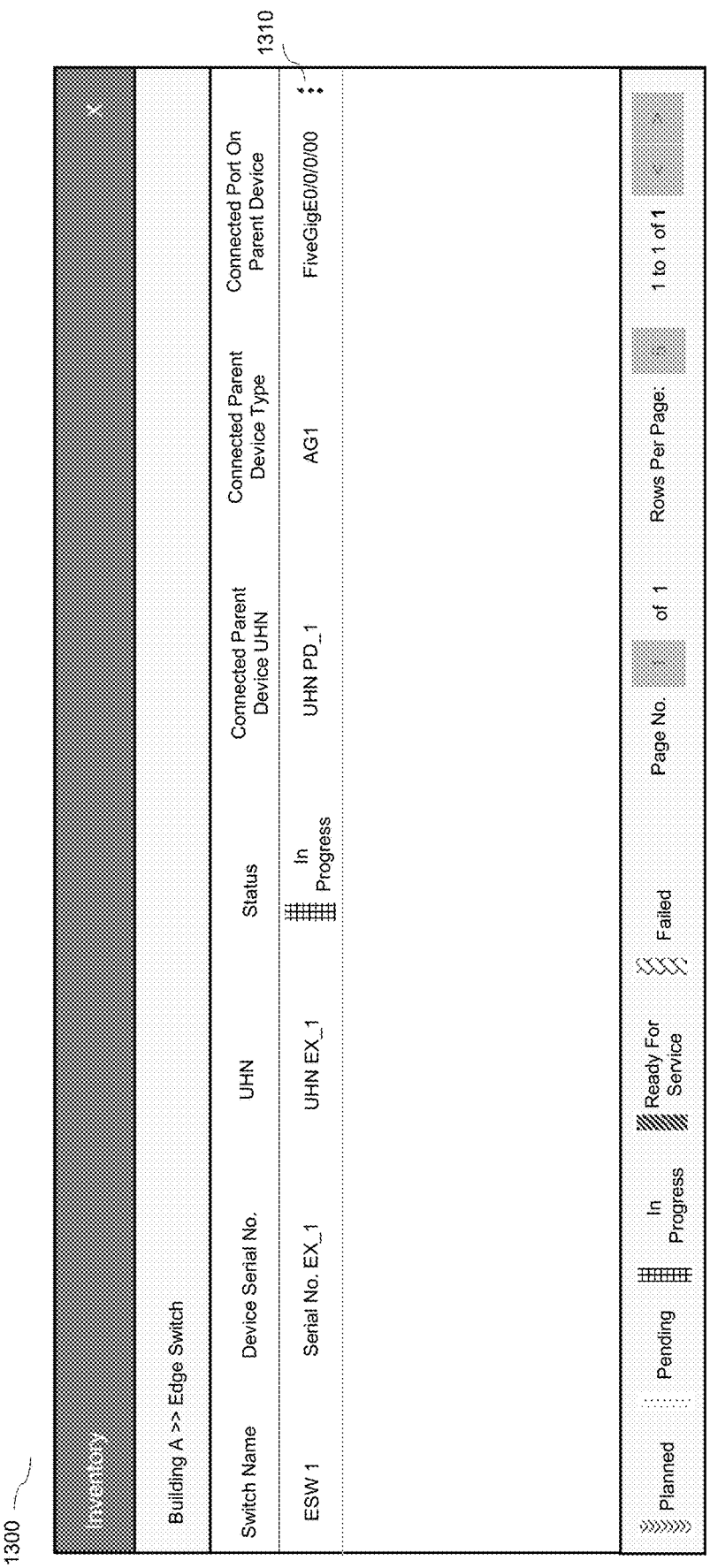
FIG. 13 illustrates an example GUI for presenting information of one or more network devices, according to one or more embodiments.

Referring next to FIG. 13, which illustrates an example GUI 1300 for presenting information of one or more network devices, according to one or more embodiments. The GUI 1300 may be generated and presented by the at least one processor 112 of the provisioning management system 110, in response to a user interaction on the interactive text of the information category "INVENTORY" in the second portion of any of the previously described GUIs and in response to a user selection for viewing a specific type of network device.

In this example embodiment, a network device type of "Edge Switch" is selected, and thus the at least one processor 112 may generate and present the GUI 1300 in a manner different from the previously described GUIs. For instance, the GUI 1300 does not include the second portion (as in the previously described GUIs) in this example embodiment, although it can be understood that the user may configure the presentation style so that the at least one processor 112 generate the GUI 1300 in a similar manner as the previously described GUIs.

As illustrated in FIG. 13, since "Edge Switch" is selected, the information presented in the GUI 1300 are associated with the edge switch(es) associated with the site. It can be understood that information of any other suitable types of network devices (e.g., SC device, floor switch, etc.) may be presented in a respective GUI in a similar manner. Further, the GUI 1300 may include an interactive element 1310 which, when being interacted by the user, causes the at least one processor 112 to generate one or more additional GUIs to present additional information of the respective network device.

Figure 14A:
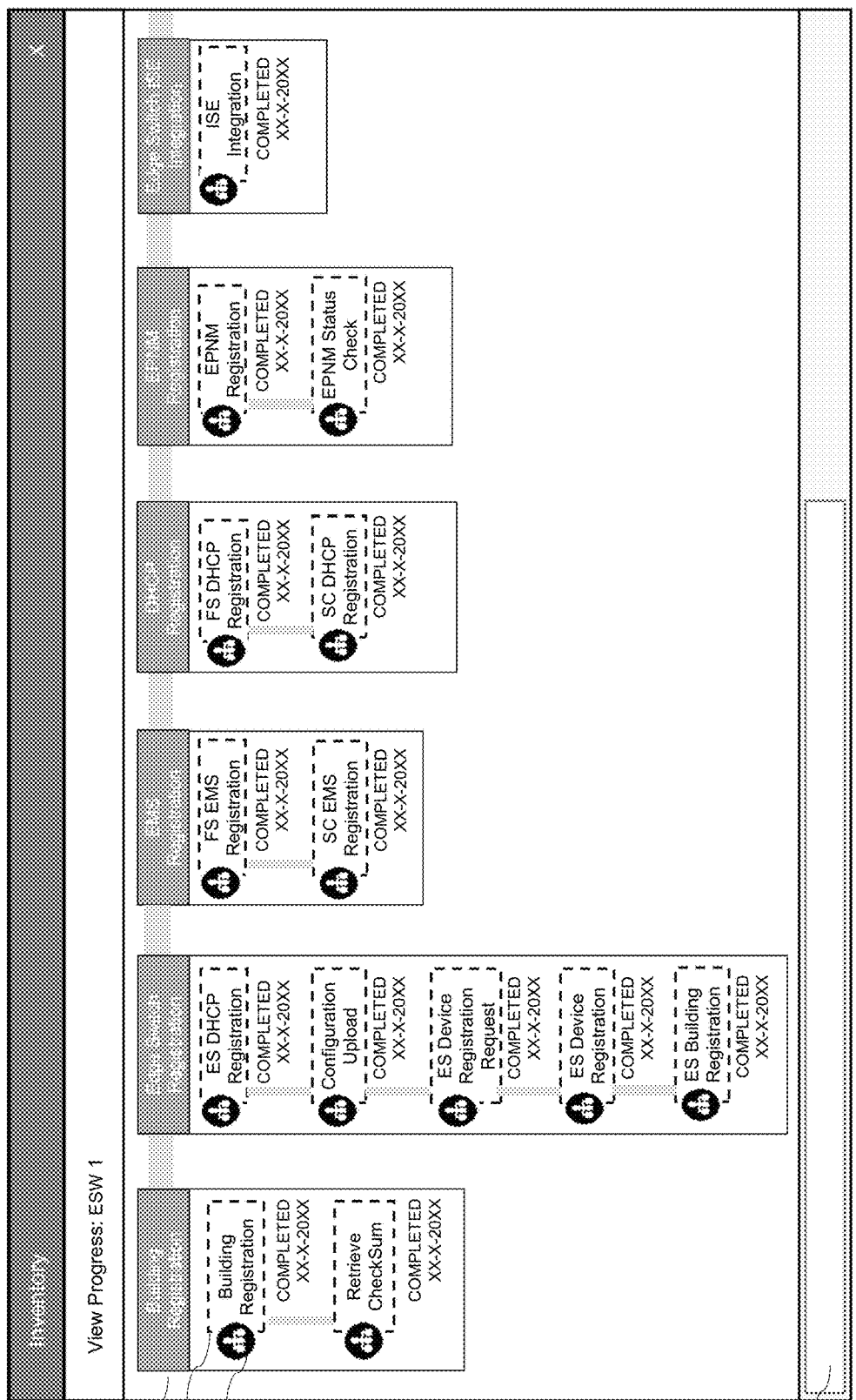
FIG. 14A and FIG. 14B illustrate an example GUI for presenting progress information of the network device in the GUI of FIG. 13, according to one or more embodiments.
Figure 14B:
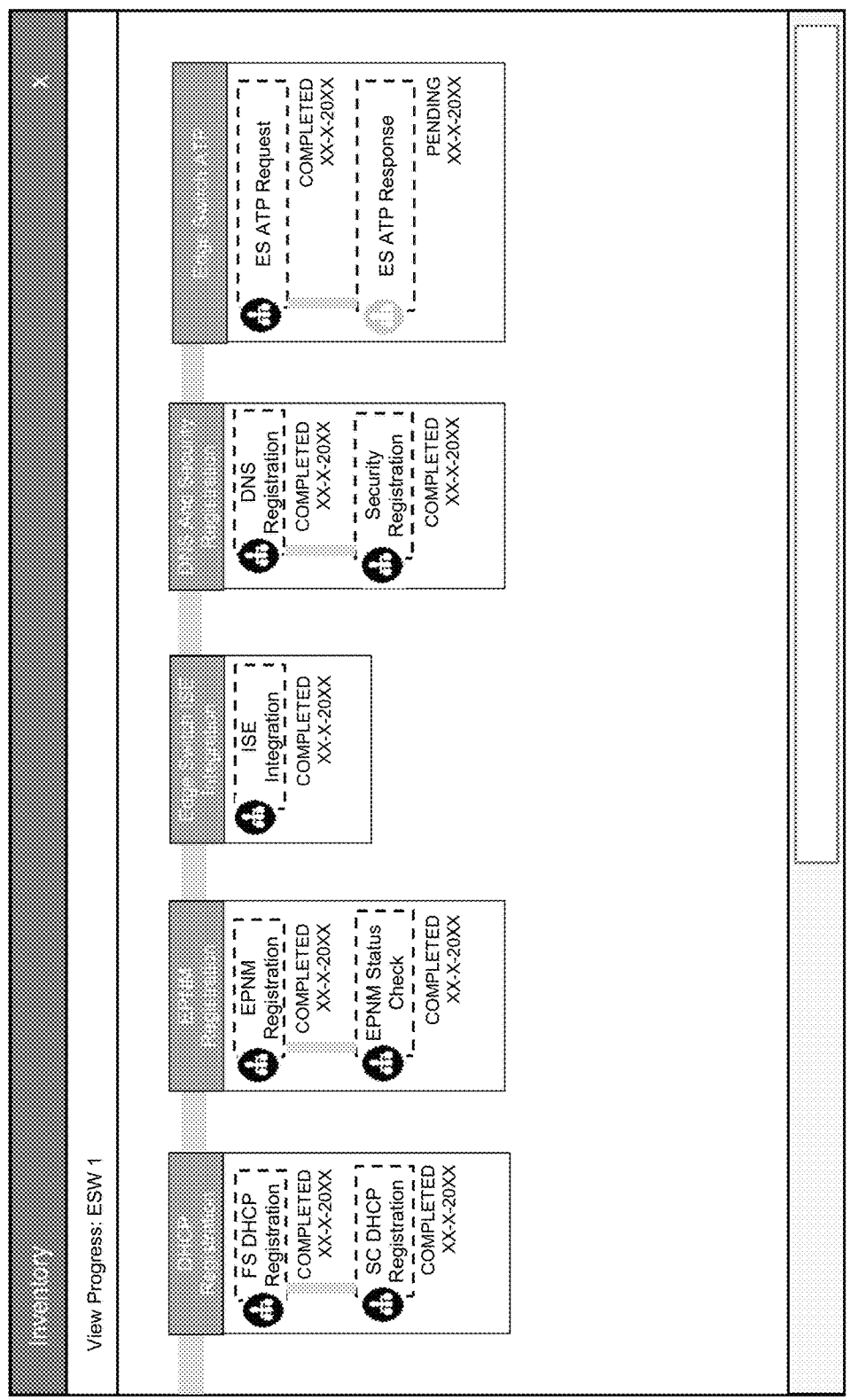

For instance, FIG. 14A and FIG. 14B illustrate an example GUI 1400 for presenting progress information of the network device in the GUI 1300 of FIG. 13. The GUI 1400 may be generated and presented by the at least one processor 112 of the provisioning management system 110, in response to a user interaction on the interactive element 1310 in the GUI 1300.

Referring to FIG. 14A, the GUI 1400 may include a progress board forming by a plurality of block elements 1410. Each of the block elements 1410 may be associated with a configuration progress of the network device (e.g., building registration, edge switch registration, etc.), and may be arranged based on the sequential relationship among the configuration progress (e.g., building registration first followed by edge switch registration, etc.). Further, each of the block elements 1410 may contains one or more sub-block elements 1411, each of which may be associated with a sub-progress of the respective configuration progress. Each of the sub-block elements 1411 may have a progress status indicator 1412 presented along therewith.

The GUI 1400 may also include a scroll bar 1420 which, when being interacted by the user (e.g., scrolled, clicked-and-moved, etc.), causes the at least one processor 112 to update the GUI 1400 (in real-time or near real-time) to instantly present the remaining progress information. For instance, FIG. 14B illustrates an example use case in which the user has interacted with the scroll bar 1420 in FIG. 14A, according to one or more embodiments. Referring to FIG. 14B, the GUI 1400 may contain block elements associated with the remaining configuration progress of the network device, which are not presented in the GUI 1400 in FIG. 14A. Further, in this example embodiment, since the sub-progress "ES ATP Response" of the configuration progress "Edge Switch ATP" is pending, the progress status indicator presented along with the sub-block element of said sub-progress may be presented in a manner distinguish from other sub-progresses which are completed.

Referring next to FIG. 15, which illustrates an example GUI 1500 for presenting information of auto-commissioning operation, according to one or more embodiments. The GUI 1500 may be generated and presented by the at least one processor 112 of the provisioning management system 110, in response to a user interaction on the interactive text of the information category "AUTO COMMISSIONING" in the second portion of any of the previously described GUIs.

As illustrated in FIG. 15, the GUI 1500 may include information of one or more triggers involved in auto-commissioning operation, such as information of IP transport trigger, information of ATP trigger, and the like. Further, the GUI 1500 may also include a plurality of interactive elements which, when being interacted by the user, causes the at least one processor 112 to perform an associated action or operation.

For instance, upon determining a user interaction on the "RETRIGGER" button, the at least one processor 112 may re-send the associated trigger(s) to the device management system and/or to the associated network device(s). Further, upon detecting a user interaction on the "DOWNLOAD" button, the at least one processor 112 may aggregate information of the associated trigger(s), may generate a file or a document based on the aggregated information, and may send the generated file/document to an equipment of the user. The downloaded file/document may be in any computer readable format, such as JSON format, or the like.

An example of IP transport trigger is illustrated in FIG. 16, and an example of ATP trigger is illustrated in FIG. 17. It can be understood that the contents of the IP transport trigger and/or the ATP trigger may be different from those illustrated in FIG. 16 and FIG. 17 in actual scenario, without departing from the scope of the present disclosure.

Example Implementation Environment

Figure 18:
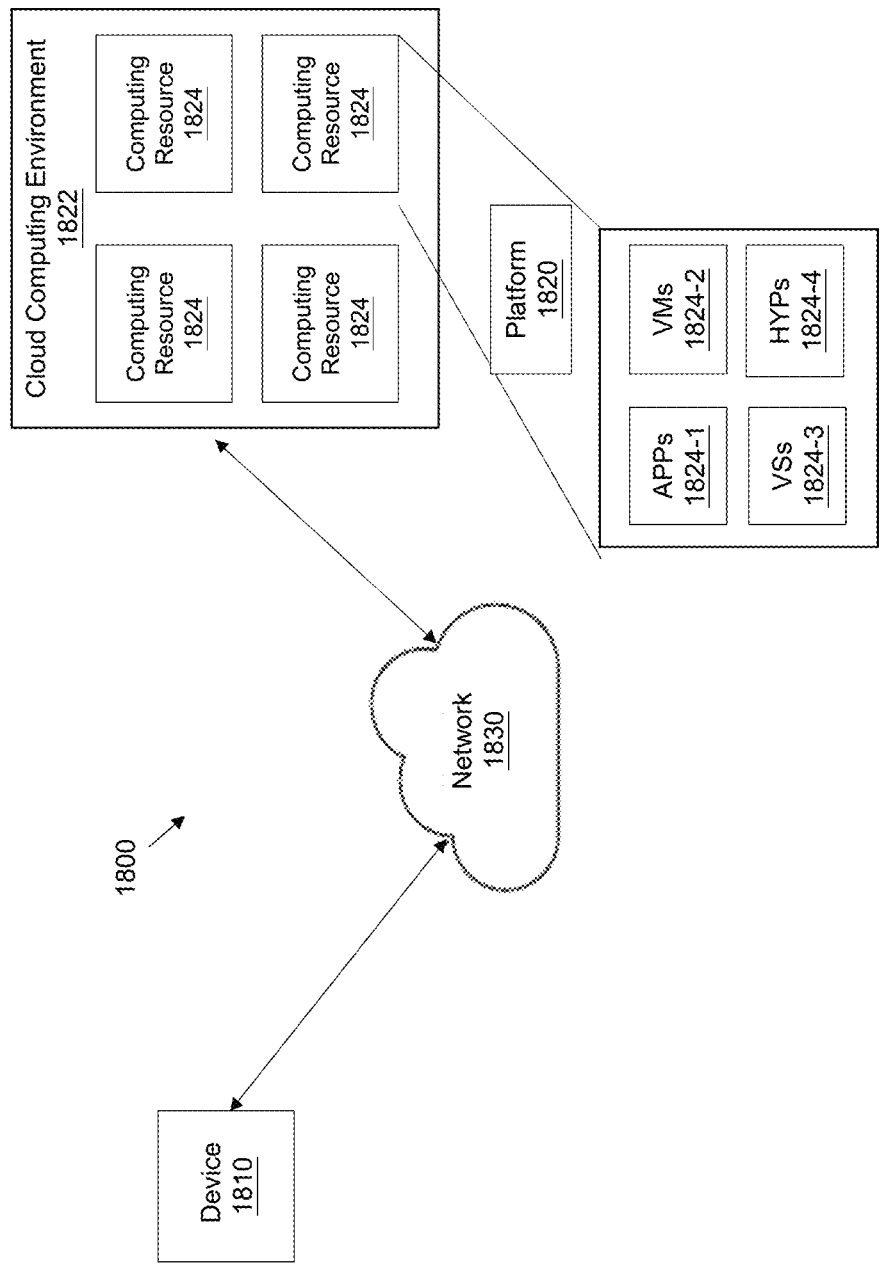
FIG. 18 illustrates a diagram of an example environment in which systems and/or methods, described herein, may be implemented.

FIG. 18 is a diagram of an example environment 1800 in which systems and/or methods, described herein, may be implemented. As shown in FIG. 18, environment 1800 may include a device 1810, a platform 1820, and a network 1830. Devices of environment 1800 may interconnect via wired connections, wireless connections, or a combination of wired and wireless connections. In embodiments, any of the features, functions and operations described with reference to FIG. 1 to FIG. 17 above may be performed by any combination of elements illustrated in FIG. 18.

According to embodiments, the provisioning management system 110 described herein may be stored, hosted, or deployed in the cloud computing platform 1820. In this regard, device 1810 may include a device, system, equipment, or the like, utilized by the users in network device provisioning. In that case, device 1810 may include one or more devices capable of receiving, generating, storing, processing, and/or providing information associated with platform 1820. For example, device 1810 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, device 1810 may receive information from and/or transmit information to platform 1820.

Additionally or alternatively, the device 1810 may refer to the network devices involved in the network device provisioning. In this regard, device 1810 may include any suitable type of network devices as described above, and may communicate with the provisioning management system 110 hosted in the platform 1820.

Platform 1820 includes one or more devices capable of receiving, generating, storing, processing, and/or providing information. In some implementations, platform 1820 may include a cloud server or a group of cloud servers. In some implementations, platform 1820 may be designed to be modular such that certain software components may be swapped in or out depending on a particular need. As such, platform 1820 may be easily and/or quickly reconfigured for different uses.

In some implementations, as shown, platform 1820 may be hosted in cloud computing environment 1822. Notably, while implementations described herein describe platform 1820 as being hosted in cloud computing environment 1822, in some implementations, platform 1820 may not be cloud-based (i.e., may be implemented outside of a cloud computing environment) or may be partially cloud-based.

Cloud computing environment 1822 includes an environment that hosts platform 1820. Cloud computing environment 1822 may provide computation, software, data access, storage, etc. services that do not require end-user (e.g., device 1810) knowledge of a physical location and configuration of system(s) and/or device(s) that hosts platform 1820. As shown, cloud computing environment 1822 may include a group of computing resources 1824 (referred to collectively as "computing resources 1824" and individually as "computing resource 1824").

Computing resource 1824 includes one or more personal computers, a cluster of computing devices, workstation computers, server devices, or other types of computation and/or communication devices. In some implementations, computing resource 1824 may host platform 1820. The cloud resources may include compute instances executing in computing resource 1824, storage devices provided in computing resource 1824, data transfer devices provided by computing resource 1824, etc. In some implementations, computing resource 1824 may communicate with other computing resources 1824 via wired connections, wireless connections, or a combination of wired and wireless connections.

As further shown in FIG. 18, computing resource 1824 includes a group of cloud resources, such as one or more applications ("APPs") 1824-1, one or more virtual machines ("VMs") 1824-2, virtualized storage ("VSs") 1824-3, one or more hypervisors ("HYPs") 1824-4, or the like.

Application 1824-1 includes one or more software applications that may be provided to or accessed by user device 1810. Application 1824-1 may eliminate a need to install and execute the software applications on user device 1810. For example, application 1824-1 may include software associated with platform 1820 and/or any other software capable of being provided via cloud computing environment 1822. In some implementations, one application 1824-1 may send/receive information to/from one or more other applications 1824-1, via virtual machine 1824-2.

Virtual machine 1824-2 includes a software implementation of a machine (e.g., a computer) that executes programs like a physical machine. Virtual machine 1824-2 may be either a system virtual machine or a process virtual machine, depending upon use and degree of correspondence to any real machine by virtual machine 1824-2. A system virtual machine may provide a complete system platform that supports execution of a complete operating system ("OS"). A process virtual machine may execute a single program, and may support a single process. In some implementations, virtual machine 1824-2 may execute on behalf of a user (e.g., user device 1810), and may manage infrastructure of cloud computing environment 1822, such as data management, synchronization, or long-duration data transfers.

Virtualized storage 1824-3 includes one or more storage systems and/or one or more devices that use virtualization techniques within the storage systems or devices of computing resource 1824. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 1824-4 may provide hardware virtualization techniques that allow multiple operating systems (e.g., "guest operating systems") to execute concurrently on a host computer, such as computing resource 1824. Hypervisor 1824-4 may present a virtual operating platform to the guest operating systems, and may manage the execution of the guest operating systems. Multiple instances of a variety of operating systems may share virtualized hardware resources.

Network 1830 includes one or more wired and/or wireless networks. For example, network 1830 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 18 are provided as an example. In practice, there may be additional devices and/or networks, fewer devices and/or networks, different devices and/or networks, or differently arranged devices and/or networks than those shown in FIG. 18. Furthermore, two or more devices shown in FIG. 18 may be implemented within a single device, or a single device shown in FIG. 18 may be implemented as multiple, distributed devices. Additionally, or alternatively, a set of devices (e.g., one or more devices) of environment 1800 may perform one or more functions described as being performed by another set of devices of environment 1800.

Various Aspects of Embodiments

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer readable media according to various embodiments. In this regard, each block in the flowcharts or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Various further respective aspects and features of embodiments of the present disclosure may be defined by the following items:

Item [1]: A system including: a memory storage storing computer-executable instructions; and at least one processor communicatively coupled to the memory storage, wherein the at least one processor may be configured to execute the instructions to: collect information from one or more information resources; process the collected information; and based on the processed information, perform an action associated with provisioning of one or more network devices.

Item [2]: The system according to item [1], wherein the one or more information resources may include at least one of: a network planning system, a ticket management system, a user management system, and a user equipment; wherein the at least one processor may be configured to execute the instructions to process the collected information by: filtering the collected information according to one or more information categories; and aggregating the filtered information according to the one or more information categories.

Item [3]: The system according to item [2], wherein the one or more information categories may include at least one of: network device type, site information, project information, document information, ticket information, and auto-commissioning information.

Item [4]: The system according to any one of items [2]-[3], wherein the at least one processor may be configured to execute the instructions to perform the action by storing the aggregated information according to the one or more information categories.

Item [5]: The system according to item [2], wherein the one or more information categories may include auto-commissioning information, and wherein the at least one processor may be configured to execute the instructions to perform the action by: generating, based on the auto-commissioning information, one or more triggers for commissioning the one or more network devices; and commissioning the one or more network devices based on the one or more triggers.

Item [6]: The system according to item [5], wherein the at least one processor may be configured to execute the instructions to perform the commissioning by: outputting the one or more triggers to a device management system communicatively coupled to the one or more network devices; wherein the device management system may include at least one of: an operations support system (OSS), an element management system (EMS), and a network management system (NMS); and wherein the device management system may be configured to perform the commissioning on the one or more network devices based on the one or more triggers.

Item [7]: The system according to item [6], wherein the at least one processor may be configured to execute the instructions to output the one or more triggers by: generating at least one graphical user interface (GUI) including the auto-commissioning information and at least one interactive element; presenting the at least one GUI to a user; and based on determining a user interaction with the at least one interactive element, outputting the one or more triggers to the device management system.

Item [8]: The system according to any one of items [5]-[7], wherein the one or more triggers may include at least one of: an Internet Protocol (IP) transport trigger and an Acceptance Test Procedure (ATP) trigger.

Item [9]: The system according to any one of items [2]-[8], wherein the at least one processor may be configured to execute the instructions to perform the action by: generating, based on the aggregated information, one or more GUIs, each of which may include information associated with a respective information category among the one or more information categories; and presenting the one or more GUIs to a user.

Item [10]: A method, performed by at least one processor, including: collecting information from one or more information resources; processing the collected information; and based on the processed information, performing an action associated with provisioning of one or more network devices.

Item [11]: The method according to item [10], wherein the one or more information resources may include at least one of: a network planning system, a ticket management system, a user management system, and a user equipment; wherein the processing the collected information may include: filtering the collected information according to one or more information categories; and aggregating the filtered information according to the one or more information categories.

Item [12]: The method according to item [11], wherein the one or more information categories may include at least one of: network device type, site information, project information, document information, ticket information, and auto-commissioning information.

Item [13]: The method according to any one of items [11]-[12], wherein the performing the action may include storing the aggregated information according to the one or more information categories.

Item [14]: The method according to item [11], wherein the one or more information categories may include auto-commissioning information, and wherein the performing the action may include: generating, based on the auto-commissioning information, one or more triggers for commissioning the one or more network devices; and commissioning the one or more network devices based on the one or more triggers.

Item [15]: The method according to item [14], wherein the commissioning the one or more network devices may include: outputting the one or more triggers to a device management system communicatively coupled to the one or more network devices; wherein the device management system may include at least one of: an operations support system (OSS), an element management system (EMS), and a network management system (NMS); and wherein the device management system may be configured to perform the commissioning on the one or more network devices based on the one or more triggers.

Item [16]: The method according to item [15], wherein the outputting the one or more triggers may include: generating at least one graphical user interface (GUI) including the auto-commissioning information and at least one interactive element; presenting the at least one GUI to a user; and based on determining a user interaction with the at least one interactive element, outputting the one or more triggers to the device management system.

Item [17]: The method according to any one of items [14]-[16], wherein the one or more triggers may include at least one of: an Internet Protocol (IP) transport trigger and an Acceptance Test Procedure (ATP) trigger.

Item [18]: The method according to any one of items [11]-[17], wherein the performing the action may include: generating, based on the aggregated information, one or more GUIs, each of which may include information associated with a respective information category among the one or more information categories; and presenting the one or more GUIs to a user.

Item [19]: A non-transitory computer-readable recording medium having recorded thereon instructions executable by at least one processor to cause the at least one processor to perform a method including: collecting information from one or more information resources; processing the collected information; and based on the processed information, performing an action associated with provisioning of one or more network devices.

Item [20]: The non-transitory computer-readable recording medium according to item [19], wherein the one or more information resources may include at least one of: a network planning system, a ticket management system, a user management system, and a user equipment; wherein the processing the collected information may include: filtering the collected information according to one or more information categories; and aggregating the filtered information according to the one or more information categories.

It can be understood that numerous modifications and variations of the present disclosure are possible in light of the above teachings. It will be apparent that within the scope of the appended clauses, the present disclosures may be practiced otherwise than as specifically described herein.

What is claimed is:

1. A system comprising:
    a memory storage storing computer-executable instructions; and
    at least one processor communicatively coupled to the memory storage, wherein the at least one processor is configured to, automatically generate one or more triggers based one or more templates for provisioning of one or more network devices, execute the instructions to:
      collect information from one or more information resources, the collected information comprising auto-commissioning information;
      process the collected information; and
      based on the processed information, perform an action to facilitate the provisioning of the one or more network devices, the performance of the action comprising:
        selecting, based on the one or more triggers to be generated, the one or more templates;
        extracting, based on the selected one or more templates, information specified by the one or more templates for generating the one or more triggers from auto-commissioning information;
        generating, based on the extracted information, the one or more triggers for commissioning the one or more network devices, wherein the processor is configured to enrich the extracted information to correct errors in the information, and
        selectively outputting the one or more triggers to a device management system to automatically commission the one or more network devices by configuring the one or more network devices with the one or more triggers.

2. The system according to claim 1,
    wherein the one or more information resources comprises at least one of: a network planning system, a ticket management system, a user management system, and a user equipment;
    wherein the at least one processor is configured to execute the instructions to process the collected information by:
      filtering the collected information according to one or more information categories; and
      aggregating the filtered information according to the one or more information categories.

3. The system according to claim 2, wherein the one or more information categories comprise the auto-commissioning information and at least one of: network device type, site information, project information, document information, and ticket information.

4. The system according to claim 2, wherein the at least one processor is configured to execute the instructions to perform the action by storing the aggregated information according to the one or more information categories.

5. The system according to claim 1,
wherein the device management system comprises at least one of: an operations support system (OSS), an element management system (EMS), and a network management system (NMS); and
wherein the device management system is configured to perform the commissioning on the one or more network devices based on the one or more triggers.

6. The system according to claim 5, wherein the at least one processor is configured to execute the instructions to selectively output the one or more triggers by:
generating at least one graphical user interface (GUI) comprising the auto-commissioning information and at least one interactive element;
presenting the at least one GUI to a user; and
based on determining a user interaction with the at least one interactive element, outputting the one or more triggers to the device management system.

7. The system according to claim 1, wherein the one or more triggers comprise at least one of: an Internet Protocol (IP) transport trigger and an Acceptance Test Procedure (ATP) trigger.

8. The system according to claim 2, wherein the at least one processor is configured to execute the instructions to perform the action by:
generating, based on the aggregated information, one or more GUIs, each of which comprises information associated with a respective information category among the one or more information categories; and
presenting the one or more GUIs to a user.

9. The system according to claim 1, wherein the generating the one or more triggers further comprises aggregating the collected information into one or more templates.

10. A method, performed by at least one processor to automatically generate one or more triggers based one or more templates for provisioning of one or more network devices, the method comprising:
collecting information from one or more information resources;
processing the collected information; and
based on the processed information, performing an action to facilitate the provisioning of the one or more network devices, the performing the action comprising:
selecting, based on the one or more triggers to be generated, the one or more templates;
extracting, based on the selected one or more templates, information specified by the one or more templates for generating the one or more triggers from auto-commissioning information;
generating, based on the extracted information, the one or more triggers for commissioning the one or more network devices, wherein the processor is configured to enrich the extracted information to correct errors in the information, and
selectively outputting the one or more triggers to a device management system to automatically commission the one or more network devices by configuring the one or more network devices with the one or more triggers.

11. The method according to claim 10,
wherein the one or more information resources comprises at least one of: a network planning system, a ticket management system, a user management system, and a user equipment;
wherein the processing the collected information comprises: filtering the collected information according to one or more information categories; and
aggregating the filtered information according to the one or more information categories.

12. The method according to claim 11, wherein the one or more information categories comprise the auto-commissioning information and at least one of: network device type, site information, project information, document information, and ticket information.

13. The method according to claim 11, wherein the performing the action comprises storing the aggregated information according to the one or more information categories.

14. The method according to claim 10,
wherein the device management system comprises at least one of: an operations support system (OSS), an element management system (EMS), and a network management system (NMS); and
wherein the device management system is configured to perform the commissioning on the one or more network devices based on the one or more triggers.

15. The method according to claim 14, wherein the selectively outputting the one or more triggers comprises:
generating at least one graphical user interface (GUI) comprising the auto-commissioning information and at least one interactive element;
presenting the at least one GUI to a user; and
based on determining a user interaction with the at least one interactive element, outputting the one or more triggers to the device management system.

16. The method according to claim 10, wherein the one or more triggers comprise at least one of: an Internet Protocol (IP) transport trigger and an Acceptance Test Procedure (ATP) trigger.

17. The method according to claim 11, wherein the performing the action comprises:
generating, based on the aggregated information, one or more GUIs, each of which comprises information associated with a respective information category among the one or more information categories; and
presenting the one or more GUIs to a user.

18. A non-transitory computer-readable recording medium having recorded thereon instructions executable by at least one processor to, automatically generate one or more triggers based one or more templates for provisioning of one or more network devices, cause the at least one processor to perform a method comprising:
collecting information from one or more information resources;
processing the collected information; and
based on the processed information, performing an action to facilitate the provisioning of the one or more network devices, the performing the action comprising:
selecting, based on the one or more triggers to be generated, the one or more templates;
extracting, based on the selected one or more templates, information specified by the one or more templates for generating the one or more triggers from auto-commissioning information;
generating, based on the extracted information, the one or more triggers for commissioning the one or more network devices, wherein the processor is configured to enrich the extracted information to correct errors in the information, and
selectively outputting the one or more triggers to a device management system to automatically commission the one or more network devices by configuring the one or more network device with the one or more triggers.

19. The non-transitory computer-readable recording medium according to claim 18,
wherein the one or more information resources comprises at least one of: a network planning system, a ticket management system, a user management system, and a user equipment;
wherein the processing the collected information comprises:
filtering the collected information according to one or more information categories; and
aggregating the filtered information according to the one or more information categories.

* * * * *